(12) United States Patent
Shibazaki et al.

(10) Patent No.: US 9,610,971 B2
(45) Date of Patent: Apr. 4, 2017

(54) COLUMN UNIT FOR AN ELECTRIC POWER STEERING APPARATUS

(71) Applicant: NSK, LTD., Tokyo (JP)

(72) Inventors: Hiroshi Shibazaki, Gunma (JP); Tamotsu Waga, Gunma (JP); Kiyoshi Sadakata, Gunma (JP); Seiichi Moriyama, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/507,013

(22) Filed: Oct. 6, 2014

(65) Prior Publication Data

US 2015/0090520 A1  Apr. 2, 2015
US 2016/0304117 A9  Oct. 20, 2016

Related U.S. Application Data

(62) Division of application No. 13/391,471, filed as application No. PCT/JP2012/051118 on Jan. 19, 2012, now Pat. No. 8,882,146.

(30) Foreign Application Priority Data

Feb. 2, 2011  (JP) ................. 2011-020626
Mar. 14, 2011  (JP) ................. 2011-055819

(Continued)

(51) Int. Cl.
*B62D 5/04* (2006.01)
*B62D 1/19* (2006.01)
*B62D 1/16* (2006.01)

(52) U.S. Cl.
CPC ............. *B62D 5/0406* (2013.01); *B62D 1/16* (2013.01); *B62D 1/192* (2013.01); *B62D 5/0403* (2013.01)

(58) Field of Classification Search
CPC ......... B62D 1/192; B62D 1/16; B62D 5/0403
See application file for complete search history.

(56) References Cited

U.S. PATENT DOCUMENTS 5,127,670 A    7/1992  Hoblingre et al.
6,006,854 A *  12/1999  Nakajima ............ B62D 1/192
                                                180/444

(Continued)

FOREIGN PATENT DOCUMENTS

JP    4940104    11/1974
JP    01165879   11/1989

(Continued)

OTHER PUBLICATIONS

European Search Report dated Mar. 2, 2016.

*Primary Examiner* — Faye M Fleming
(74) *Attorney, Agent, or Firm* — Hartman Global IP Law; Gary M. Hartman; Michael D. Winter

(57) ABSTRACT

An electric power steering apparatus capable of being both lightweight and rigid. A lightweight electric power steering apparatus is achieved wherein a gear housing (45) that houses an electric assist mechanism, a lower support bracket (54) for fastening the gear housing (45) to the vehicle body, a sensor housing (56) that houses a torque sensor (57), an outer column (30) of a steering column (6c), and an upper support bracket (59a) for fastening the middle section of the outer column (30) to the vehicle body can all be integrally formed of synthetic resin, improving the strength of the joined sections of these members.

21 Claims, 40 Drawing Sheets

(30) Foreign Application Priority Data

Jun. 1, 2011 (JP) .................................. 2011-123504
Jun. 3, 2011 (JP) .................................. 2011-125139

(56) References Cited

U.S. PATENT DOCUMENTS

2005/0093284 A1   5/2005   Sato et al.
2011/0120798 A1   5/2011   Kawada et al.

FOREIGN PATENT DOCUMENTS

WO   2004/031018   4/2004
WO   2008/099836   8/2008

* cited by examiner

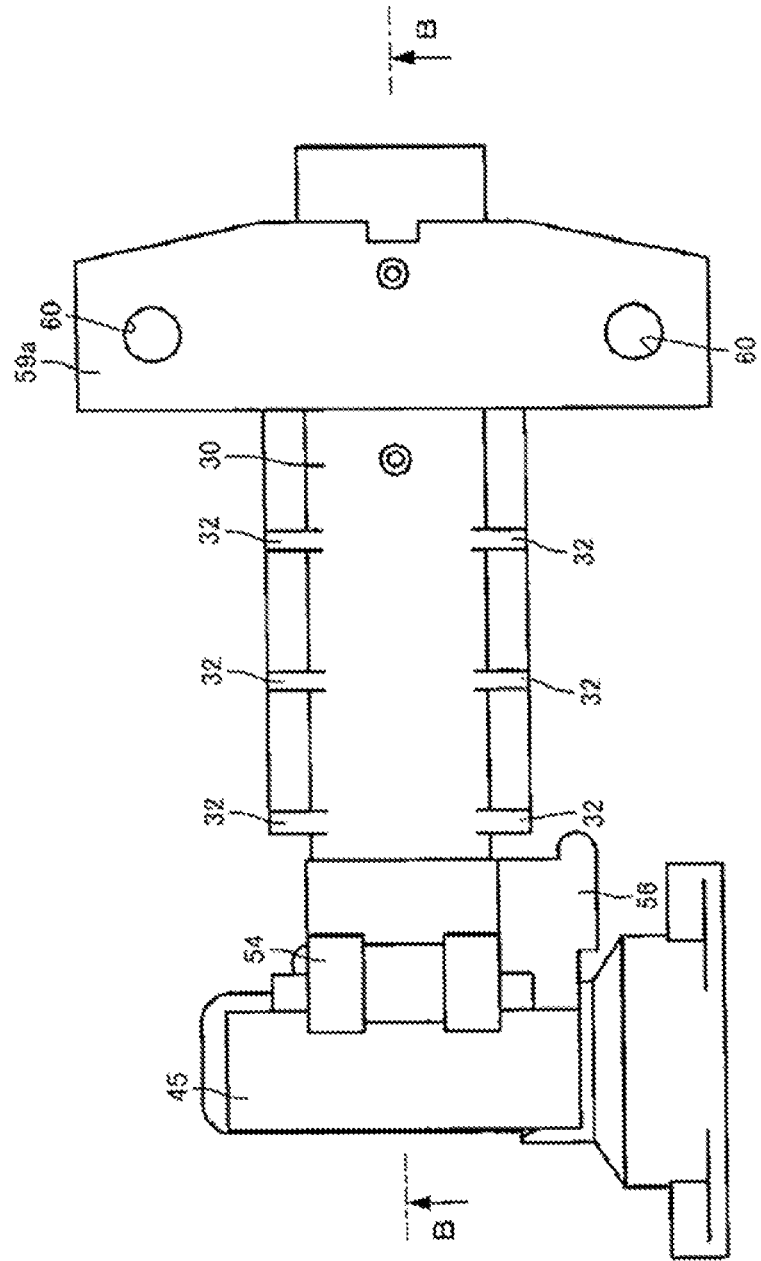

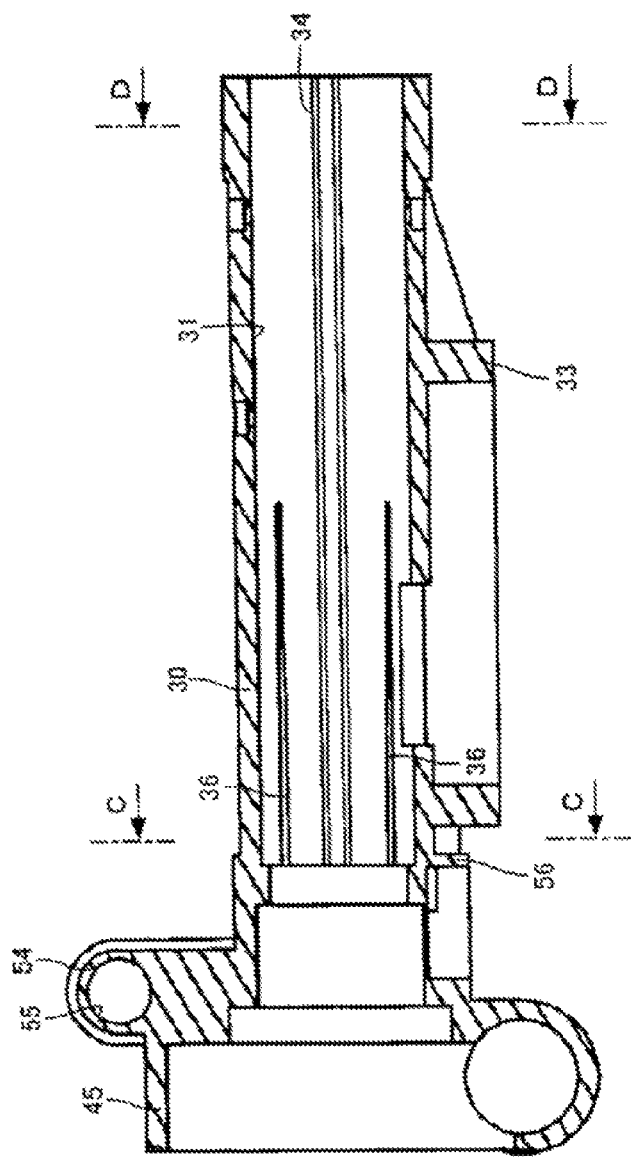
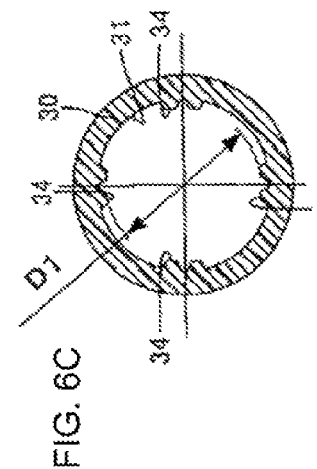
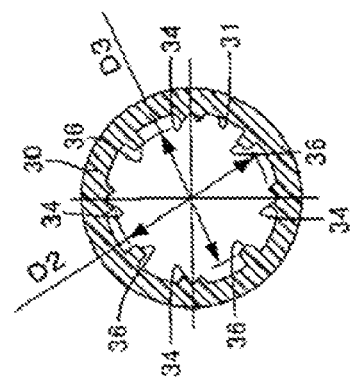

COLUMN UNIT FOR AN ELECTRIC POWER STEERING APPARATUS

CROSS REFERENCE TO RELATED APPLICATIONS

This is a division patent application of co-pending U.S. patent application Ser. No. 13/391,471, filed Mar. 11, 2013. The contents of this prior application are incorporated herein by reference.

BACKGROUND OF THE INVENTION

The present invention is related to a column unit for an electric power steering apparatus comprising a steering column for supporting a steering shaft on the inside thereof such that the steering shaft can rotate freely, and a housing that houses component parts of the electric power steering apparatus inside thereof.

As illustrated in FIG. 45, a steering apparatus for an automobile is constructed so as to apply a steering angle to the front wheels by pushing or pulling a pair of left and right tie rods as rotation from the steering wheel 1 is transmitted to the input shaft 3 of a steering unit 2 and rotates the input shaft 3. The steering wheel 1 is supported by and fastened to the rear end section of a steering shaft 5, and with this steering shaft 5 inserted in the axial direction through a cylindrical shaped steering column 6, the steering shaft 5 is supported by the steering column 6 so as to be able to rotate freely. In an electric power steering apparatus, the front end section of the steering column 6 connected and fastened to the rear end section of a housing 9 that houses a worm reducer 7 and a torque sensor (displacement sensor) 14 (FIG. 31) which constitutes a torque measurement apparatus 8, that form an electric assist mechanism (steering assist unit). Moreover, an electric motor 10, which functions as a power source for the electric assist mechanism, is supported by and fastened to the housing 9.

When the steering shaft 5 is rotated by the steering wheel 1, the torque measurement apparatus 8 measures the direction and size of the torque that is applied to the steering shaft 5. This torque measurement apparatus 8 is supported inside the housing 9 so that it can rotate freely, and comprises an input shaft 12 and output shaft 13 that are connected together by a torsion bar 11, and a torque sensor 14 for measuring the amount of relative displacement in the direction of rotation between the input shaft 12 and output shaft 13. Based on the measurement results from this torque measurement apparatus 8, the electric motor 10 applies assist torque in the same direction as the operating direction of the steering wheel 1 to the output shaft 13 by way of a worm and a worm wheel which is provided on the output shaft 13 and engages with the worm, and the causes the output shaft 13 to rotate with a torque larger than the torque inputted to the input shaft 12 from the steering shaft 5.

The tip end section of the output shaft 13 is connected to the rear end section of an intermediate shaft by way of a universal joint 15a, and the front end section of this intermediate shaft 16 is connected to the input shaft 3 by way of a separate universal joint 15b. The construction illustrated in FIG. 45 incorporates both a tilt mechanism for adjusting the up/down position of the steering wheel 1, and a telescopic mechanism for adjusting the forward/backward position. Therefore, the middle section of the steering column 6 is supported by an upper support bracket 18 that is supported by the vehicle body 17 such that adjustment of the up/down position and the forward/backward position is possible. In order to construct this tilt mechanism, a support cylinder 19 that is provided on the top end section on the front side of the housing 9 is supported by the vehicle body 17 by way of a lower support bracket 23 so that tilting about the horizontal axis is possible. Moreover, in order to construct the telescopic mechanism, the steering shaft 5 is a combination of an inner shaft and an outer shaft that are capable of transmitting torque and can be expanded or contracted, and the steering column 6 is a combination of an outer column and an inner column that can be expanded and contracted.

In a column unit for an electric power steering apparatus comprising a combination of this kind of steering column 6 and housing 9, In order to lighten the weight and reduce the cost, manufacturing the housing 9 using synthetic resin is disclosed in JP2009-298246(A). FIG. 46 illustrates an example of conventional construction of the column unit for an electric power steering apparatus disclosed in JP2009-298246(A). In the case of this conventional construction, a sensor housing 20 for housing the torque measurement apparatus 8, and a gear housing 21 for housing the worm reducer 7, both being manufactured using a synthetic resin such as polyamide resin, are welded to form a hollow housing 9a. In this example, the steering column 6a comprises an outer column and an inner column that can be expanded and contracted, however, in this kind of construction, when the housing 9a is made of synthetic resin, from the aspect of maintaining the strength and rigidity, the steering column 6a may have to be formed using a metal such as a ferrous alloy. In the case of the conventional construction illustrated in FIG. 46, by fitting the front end section of the metal cylindrical shaped steering column 6a around the outside of a cylindrical section 22 that is formed on the rear end section of the housing 9a made of synthetic resin, the rear end section of the housing 9a is connected and joined with the front end section of the steering column 6a.

However, in the case of this conventional construction in which the housing 9a made of synthetic resin is combined with a metal steering column 6a in this way, increasing the bonding strength between the rear end section of the housing 9a and the front end section of the steering column 6a is difficult. In other words, even when the rear end section of the housing 9a and the front end section of the steering column 6a are fitted and fastened together by an interference fit, there is a possibility that the bonding strength of this fastened and joined section will gradually decrease due to a difference in linear expansion coefficient of the synthetic resin of the housing 9a and the metal of the steering column. Particularly, when the degree of expansion of the outer diameter of the cylindrical section 22 becomes larger than the degree of expansion of the inner diameter of the front end section of the steering column 6a, the pressure (surface pressure) holding the outer circumferential surface of the cylindrical section 22 becomes extremely large, and the cylindrical section 22 plastically deforms in a direction such that the outer diameter becomes smaller. As a result, the drop in the bonding strength with this fastened and joined section becomes very large.

Moreover, the strength and rigidity of this fastened and joined section may not be large from the initial stage due to the interference fit between metal and synthetic resin. Therefore, even when a force in the bending direction is applied to this fastened and joined section when adjusting the height of the steering wheel 1, there is a possibility that the outer circumferential surface of the cylindrical section 22 will plastically deform, and the bonding strength of this fastened and joined section will drop. In either case, when this bonding strength decreases, there is a possibility that a problem will occur of movement or vibration of this joined section between the steering column 6*a* and housing 9*a*. A similar problem may also occur when the steering column is made of a metal such as a ferrous alloy having a specified amount of strength and rigidity, and the housing is made of a metal such as an aluminum alloy that is lightweight but is soft compared to a ferrous alloy.

On the other hand, in order to protect the driver during a collision accident, a mechanism for absorbing impact during the collision is provided in the steering apparatus for an automobile. First, the intermediate shaft 8 is made so as to be able to contract along the entire length due to an impact load, such that, during a primary collision when the automobile collides with another automobile, even though the steering unit 2 displaces toward the rear, the steering wheel 1 is prevented from displacing in the rear direction by way of the steering shaft 5 so as to apply heavy pressure to the body of the driver. After the primary collision occurs, a secondary collision occurs when the body of the driver collides with the steering wheel 1, however, in the case of this collision, the driver is protected with the steering column 6 which supports the steering wheel 1 supported against the vehicle body so as to be able to break away in the forward direction due to an impact load in the forward direction that occurs during a secondary collision, and with an energy absorbing mechanism that absorb this impact load.

In this kind of impact absorbing steering column unit as well, from the aspect of reducing the weight and lower the cost, efforts are being made to reduce the weight of the steering column itself. FIG. 47 illustrates an example of a column unit for an electric power steering apparatus that is disclosed in JP2010-36677(A). In this construction, the outer column 24 of the steering column 6*b* comprises a support cylinder 26 that is made of metal and a sleeve 27 that is made of synthetic resin, and a metal inner column 25 of the steering column 6*b* fits around the inside of the inner circumferential surface of the sleeve 27. Moreover, a plurality of protrusions 28 are formed in the portion on the inner circumferential surface on the rear end section of the sleeve 27 where the inner column 25 does not normally fit, and impact energy is absorbed when the inner column 25 scrapes off these protrusions 28. In this construction, by lightening the weight by making the sleeve 27 of the outer column 24 using synthetic resin, and providing an energy absorbing mechanism inside the steering column 6*b*, the impact absorbing column unit can be made more compact and the stable impact energy absorbing characteristics are achieved.

However, in the apparatus disclosed in JP2010-36677(A), the sleeve 27 of the outer column 24 is formed using synthetic resin, however weight is not sufficiently reduced. Furthermore, there is a need for not only reducing the overall weight of the unit, but in studying improvement thereof, a need arose to maintain a specified amount of strength and rigidity of the impact absorbing steering column, and furthermore to maintain the installation rigidity between the steering column and the vehicle body during a secondary collision.

BRIEF DESCRIPTION OF THE INVENTION

In consideration of the problems described above, the object of the present invention is to provide construction of a column unit for an electric power steering apparatus that is both lightweight and maintains sufficient strength and rigidity. Furthermore, another object of the present invention is to provide construction that is both lightweight and maintains sufficient strength and rigidity, while at the same time improves the installation rigidity with respect to the vehicle body.

Moreover, in an aspect where it is necessary to form one of either the steering column or housing of the column unit using synthetic resin and the other using a metal, another object of the present invention is to provide construction that is both lightweight and maintains sufficient strength and rigidity, while at the same time maintains strength and rigidity of the joined section between the front end section of the steering column and the rear end section of the housing.

The column unit for an electric power steering apparatus according to first aspect of the present invention, comprises:

a steering column that comprises an outer column, and an inner column, which is located on the vehicle-rear side of the outer column, fits inside the outer column and can collapse toward the vehicle-front side during a secondary collision, and that supports a steering shaft on the inside thereof such that the steering shaft can rotate;

a housing that comprises a sensor housing, which houses a torque sensor that detects the torque acting on the steering shaft, and a gear housing, which houses part of an electric assist mechanism that applies a specified steering assist force according to the value detected by the torque sensor;

a lower support bracket that can fasten the vehicle-front side of the outer column or the housing to the vehicle body; and an upper support bracket that can fasten the vehicle-rear side of the outer column to the vehicle body, and the gear housing and the outer column are integrally formed of synthetic resin, or the outer column, the lower support bracket and the upper support bracket are integrally formed of synthetic resin.

Preferably, in addition to the gear housing and the outer column, the lower support bracket and the sensor housing are also integrally formed of synthetic resin. Alternatively, it is preferable that in addition to the gear housing and the outer column, the lower supper bracket, the sensor housing and the upper support bracket be integrally formed of synthetic resin.

The synthetic resin is preferably a synthetic resin mixed with glass fibers.

Preferably, when the column unit for an electric power steering apparatus comprises a front cover for sealing the end surface on the vehicle-front side of the gear housing, the front cover is screwed into the end surface of the gear housing and is fastened to the gear housing by melting and fusing joined surfaces of the front cover and the gear housing while applying pressure.

It is preferable that the outer circumferential surface of the inner column be fitted with the inner circumferential surface of the outer column with an interference fit, and that shear pins, which can shear off during a secondary collision, be provided between the outer column and the inner column.

Preferably, a plurality of protrusions are formed in a plurality of locations on the inner circumferential surface of the outer column and extend in the axial direction of the outer column, and the outer circumferential surface of the inner column fits with the protrusions.

The column unit for an electric power steering apparatus according to a second aspect of the present invention, comprises:

a steering column that comprises an outer column made of synthetic resin, and an inner column, which is located on the vehicle-rear side of the outer column, fits inside the outer column and can collapse toward the vehicle-front side during a secondary collision, and that supports a steering shaft on the inside thereof such that the steering shaft can rotate;

a lower support bracket that is integrally formed with the vehicle-front side of the outer column or a portion that is integrally formed with the vehicle-front side of the outer column so as to protrude upward toward the vehicle-top side, and comprises a lower installation hole that is formed parallel with a horizontal axis line that is orthogonal to the center axis of the outer column;

an upper support bracket that is formed on the vehicle-rear side of the outer column so as to protrude upward toward the vehicle-top side and comprises an upper installation hole that is formed parallel with a horizontal axis line that is orthogonal to the center axis of the outer column;

a metal lower installation bolt that is inserted through the lower installation hole, and is for fastening the lower support bracket to a metal lower vehicle installation plate that is fastened to the vehicle body; and a metal upper installation bolt that is inserted through the upper installation hole, and is for fastening the upper support bracket to a metal upper vehicle installation plate that is fastened to the vehicle body.

The lower vehicle installation plate and the upper vehicle installation plate can be included in this column unit for an electric power steering apparatus. In this case, preferably, lower notch grooves, which are closed on the vehicle-front side and open on the vehicle-rear side and through which the lower installation bolt is inserted, are formed in the lower vehicle installation plate; and upper notch grooves, which are closed on the vehicle-front side and open on the vehicle-rear side and through which the upper installation bolt is inserted, are formed in the upper vehicle installation plate.

The groove width of both the lower notch grooves and upper notch grooves is preferably wider on the vehicle-rear side than the vehicle-front side.

Preferably, convex sections that protrude upward toward the vehicle-top side are formed on the edge sections on the vehicle-bottom side of the upper notch grooves in the middle sections in the front/rear direction further on the vehicle-rear side than the closed end sections on the vehicle-front side.

It is preferred that, the length from the closed end sections on the vehicle-front side of the edge sections on the vehicle-bottom side of the lower notch grooves to the open end sections on the vehicle-rear side be longer than the length from the closed end sections on the vehicle-front side of the edge sections on the vehicle-bottom side of the upper notch grooves to the open end sections on the vehicle-rear side.

Preferably, a plurality of upper support brackets that are separated in the front/rear direction of the vehicle are formed on the vehicle-rear side of the outer column.

A column unit for an electric power steering apparatus according to a third aspect of the present invention, comprises:

a metal steering column that is cylindrical and that supports a steering shaft inside thereof such that the steering shaft can rotate; and a housing that is joined and fastened to the front end section of the steering column and houses at least part of the component parts of the electric power steering apparatus inside thereof, the housing being made by casting of a metal that is softer than the metal of the steering column or by injection molding of synthetic resin, and a bent section, which is formed by bending the front end section of the steering column outward in the radial direction, and section where material has been removed and that pass through from the inner to outer circumferential surface or between both side surfaces of the steering column are formed in the front end section of the steering column, and the housing is casted or injection molded with the bent section and the removed sections being imbedded therein.

More specifically, construction can be employed wherein a bent section that is formed into a partial conical cylindrical shape that is inclined in a direction such that the diameter becomes larger going toward the front, and a large-diameter cylindrical section that is bent in the forward direction from the edge section on the large diameter side of the bent section are formed on the front end section of the steering column; the removed sections are a plurality of through holes that are formed at a plurality of locations in the circumferential direction of the bent section and the large-diameter section; the rear end section of the housing exists on the inner-diameter side and outer-diameter side of the bent section and large-diameter section; and part of the metal or synthetic resin of the housing enters into the though holes.

Alternatively, construction can be employed wherein the bent section is formed into an outward directed flange shape that is bend outward in the radial direction; the removed sections are a plurality of through holes that are formed in the bent section and in the portion on the front end section of the steering column that is near the rear than the bent section; the rear end section of the housing exists on both the front and rear sides of the bent section and on the inner-diameter side and outer-diameter side of the front end section of the steering column; and part of the metal or synthetic resin of the housing enters into the though holes.

Moreover, it is alternatively possible to employ construction wherein the bent section is formed into an outward directed flange shape that is bend outward in the radial direction; the removed sections are a plurality of notches that are formed on the outer perimeter edge section of the bent section; the rear end section of the housing exists on both the front and rear sides of the bent section; and part of the metal or synthetic resin of the housing enters into the notches.

A column unit for an electric power steering apparatus of a fourth aspect of the present invention, comprises:

a metal steering column that is cylindrical shaped and comprises through holes that pass through from the inner to outer circumferential surfaces of the front end section, and supports a steering shaft on the inside thereof such that the steering shaft can rotate;

a housing that is formed by casting of a metal that is softer than the metal of the steering column or by injection molding of synthetic resin, comprises a screw thread around either the inner or outer circumferential surface of the rear end section, and houses at least part component parts of the electric power steering apparatus inside thereof; and a screw ring that is formed by casting or injection molding with the portion of the front end section of the steering column that includes the through holes embedded inside, and comprises a screw thread on the surface that faces the surface of the rear end section of the housing with the above screw thread, and the screw thread of the screw ring screws together with the screw threads on the rear end section of the housing, and by tightening, the housing is joined and fastened to the steering column.

More specifically, construction can be employed wherein the screw thread of the screw ring is a male screw that is formed on the outer circumferential surface of the screw ring; a stepped large-diameter section is formed on the inner circumferential surface of the rear end section of the housing; and the screw thread of the rear end section of the housing is a female screw that is formed on the inner circumferential surface of the stepped large-diameter section.

Alternatively, construction can be employed wherein the screw thread of the screw ring is a female screw that is formed on the inner circumferential surface of the screw ring; and the screw thread of the rear end section of the housing is a male screw that is formed on the outer circumferential surface of the housing.

With the present invention, of the members of the column unit for an electric power steering apparatus, at least the gear housing and the outer column, or at least the outer column, the lower support bracket and the upper support bracket are integrally molded of synthetic resin. Therefore, the strength of the joined sections between the members of the column unit is improved, and a lightweight electric power steering apparatus can be obtained. Particularly, when the members are integrally molded together using synthetic resin mixed with glass fibers, the glass fibers are continuous and not broken, so it is possible to further improve the strength of the molded parts.

Moreover, with the present invention, of the members of the column unit, at least the outer column, the lower support bracket and the upper support bracket are made of synthetic resin, and this column unit is fastened to the vehicle body by way of the lower support bracket and upper support bracket; where at least the upper support bracket is fastened to the vehicle body by a metal upper vehicle installation plate, which is fastened to the vehicle body, and a metal upper installation bolt. Therefore, when a driver collides with the steering wheel during a secondary collision, the impact load that acts upward toward the vehicle-top side is supported by the metal upper installation bolt and the upper vehicle installation plate, so deformation that occurs in the outer column and upper support bracket that are made of synthetic resin is small, and the inner column can smoothly collapse with respect to the outer column.

Furthermore, in the present invention, when it is necessary to make the steering column, including the outer column, using metal, so in construction wherein the housing is made to be lightweight by being made of a metal that is softer than the metal of the steering column or made of synthetic resin, a bent section and removed sections are formed on the front end section of the steering column, and by casting or performing injection molding of the housing with the bent section and removed sections embedded inside, or through holes are formed in the front end section of the steering column, and by forming a screw ring on the front end section of the steering column by casting or injection molding with the portion of this front end section with the through holes embedded inside, and screwing the screw thread of the housing together with the screw thread of this screw ring, and tightening, these members are joined and fastened together. With this construction, it is possible to maintain the strength and rigidity of the joined section between the rear end section of the housing and the front end section of the steering column.

BRIEF DESCRIPTION OF THE DRAWINGS

FIG. 5 is a top view of FIG. 4.

FIG. 6A is a cross-sectional view of section B-B in FIG. 5, FIG. 6B is a cross-sectional view of section C-C in FIG. 6A, and FIG. 6C is a cross-section view of section D-D in FIG. 6A.

FIG. 37A is an end view of the front end section of the steering column, and FIG. 37B is a side view.

FIG. 38A is an end view of the front end section of the steering column, and FIG. 38B is a side view thereof.

DETAILED DESCRIPTION OF THE INVENTION

Figure 1:
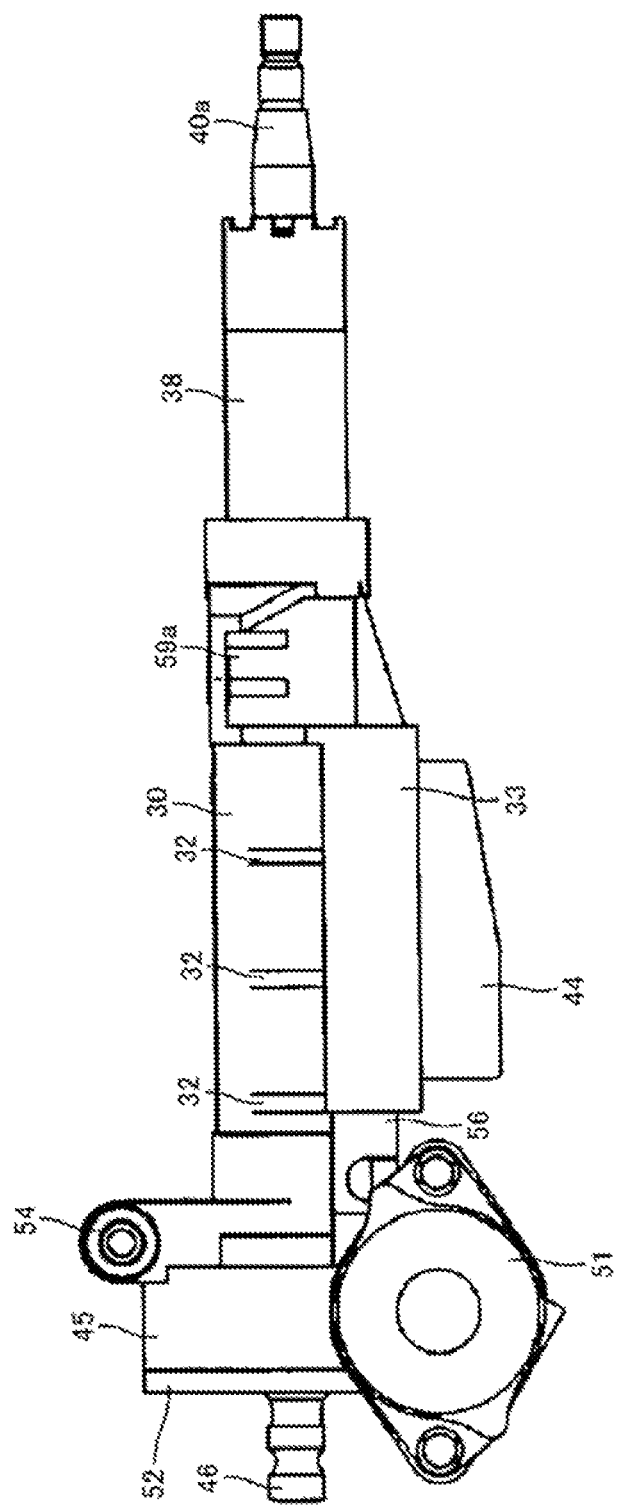
FIG. 1 illustrates a first example of a first embodiment of a column unit for an electric power steering unit of the present invention, and is a front view as seen from the side of the vehicle body.
Figure 2:
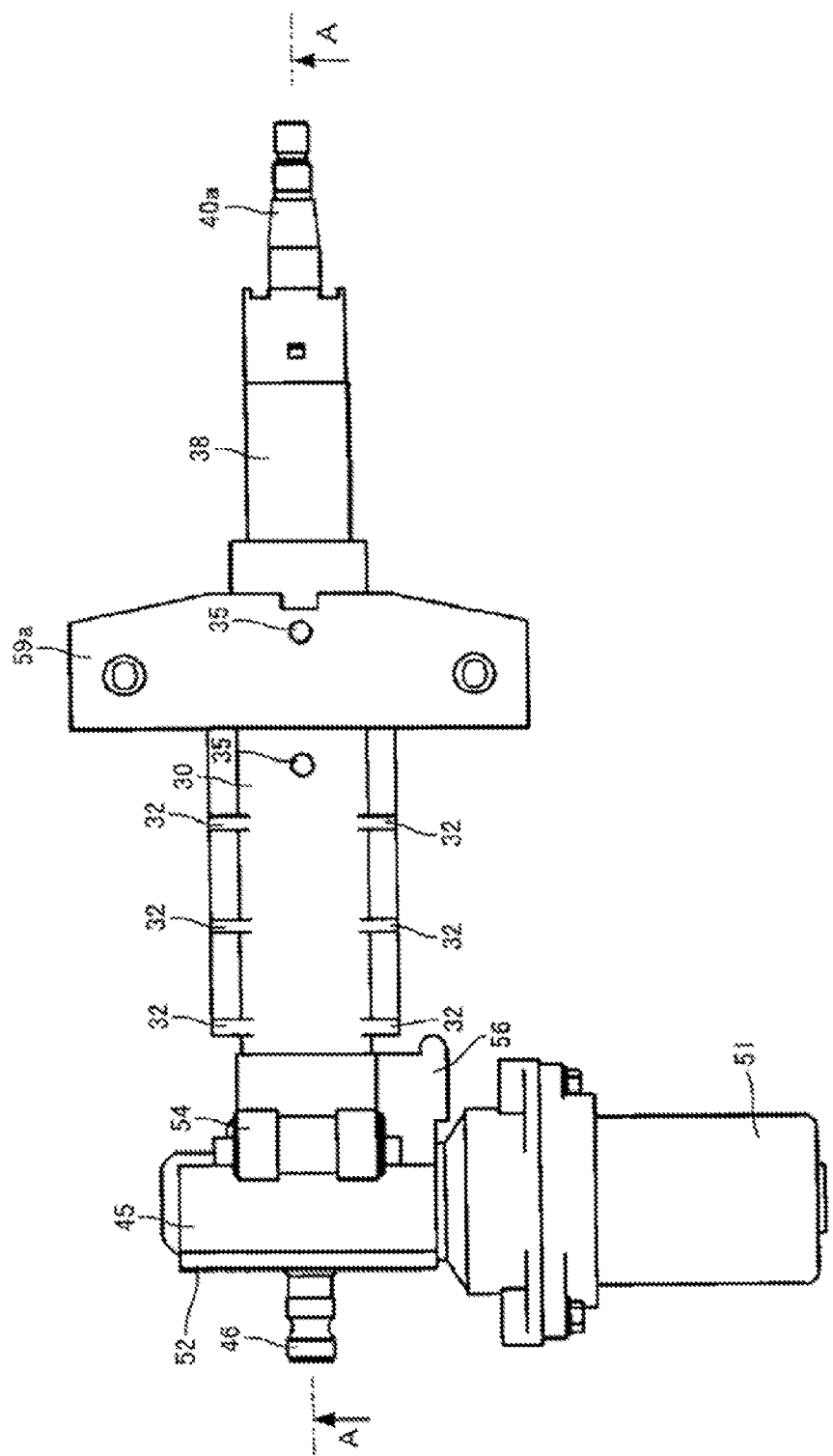
FIG. 2 is a top view of FIG. 1.

FIG. 1 to FIG. 10 illustrate a first example of a first embodiment of the present invention. Including this example, the features of the present invention is construction of a column unit for an electric power steering apparatus comprising a steering column for supporting the steering shaft on the inside thereof so as to be able to rotate freely, and a housing that inside thereof houses component parts of the electric power steering apparatus. The construction and function of the other parts are the same as in a conventional electric power steering apparatus and column unit thereof, so the explanation below, including this example, will center on the features of the present invention.

The column unit for an electric power steering apparatus of this example is applied to an electric power steering apparatus that does not comprise either a tilt mechanism or telescopic mechanism.

In the column unit of this example, an outer column 30, lower support bracket 54 for supporting and fastening the side toward the front of the vehicle of the outer column 30 to the vehicle body, an upper support bracket 59a for supporting and fastening the side toward the rear of the vehicle of the outer column 30 to the vehicle body, a gear housing (reduction gear box) 45 that is fastened to the front side of the outer column 30 and that houses component parts of the power assist mechanism (steering assist unit) of the electric power steering apparatus such as the worm reducer 7, and a sensor housing 56 that is fastened to the front side of the outer column 30 and that houses the components of the power assist mechanism such as the torque sensor 14 of the torque measurement apparatus 8, are all integrally formed using a synthetic resin mixed with glass fibers. All of these main members of the column unit are integrally molded using synthetic resin instead of being individually formed and combined by welding, so together with being able to improve the strength of the joined sections, it is possible to obtain a column unit that is lighter than a conventional unit.

Moreover, the members of the column unit are integrally molded using synthetic resin mixed with glass fibers, so the glass fibers are continuous without being broken, improving the strength of the formed parts. The outer circumferential surface 39 of the inner column 38 is fitted around then inner circumferential surface 31 of the outer column 30 so that it is able to collapse toward the front of the vehicle body. The inner column 38 is made of an aluminum alloy or a ferrous alloy such as carbon steel. The lower support bracket 54 is supported by and fastened to the vehicle body by an installation bolt (not illustrated in the figures) that is inserted through an installation hole 55. The upper support bracket 59a is supported by and fastened to the vehicle body by an installation bolt (not illustrated in the figures) that is inserted through an installation hole 60.

The lower support bracket 54 and upper support bracket 59a are integrally formed with the outer column 30, so the installation precision of the lower support bracket 54 and the upper support bracket 59a with respect to the outer column 30 is good. Therefore, when the outer column 30 is fastened to the vehicle body by way of the lower support bracket 54 and the upper support bracket 59a, the bending and twisting of the outer column 30 are reduced, so the inner column 38 can collapse smoothly. This effect can similarly be obtained when the lower support bracket 54, upper support bracket 59a and outer column 30 are constructed of integrally molded parts, and the other members are formed separately and connected and fastened to the molded parts.

The upper support bracket 59a is integrally formed with the outer column 30, and does not break away from the vehicle body during a secondary collision, so the installation hole 60 can be formed into a simple round circle, while the installation hole in an upper support bracket that conventionally broke away from the vehicle body was a long groove that was opened on the side toward the rear of the vehicle. Therefore, the rigidity of the upper support bracket 59a is increased, and it is possible to increase the installation strength of the upper support bracket 59a with respect to the vehicle body.

Figure 3:
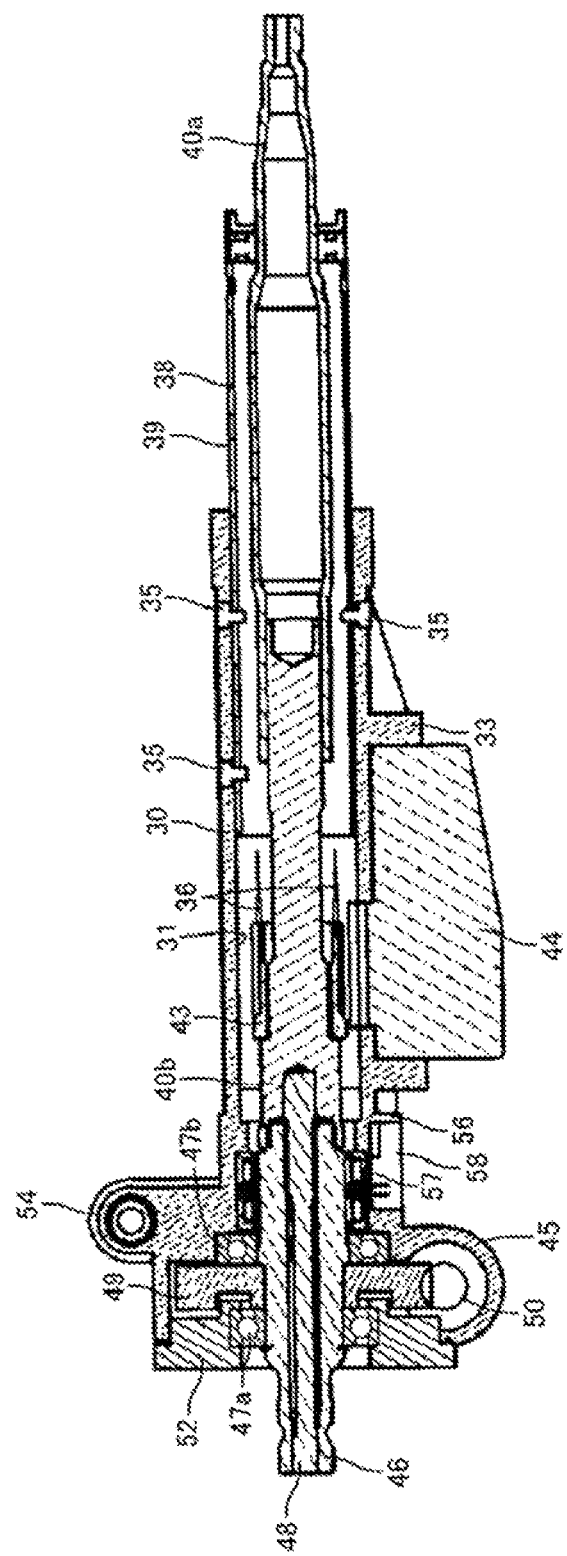
FIG. 3 is a cross-sectional view of section A-A in FIG. 2.
Figure 4:
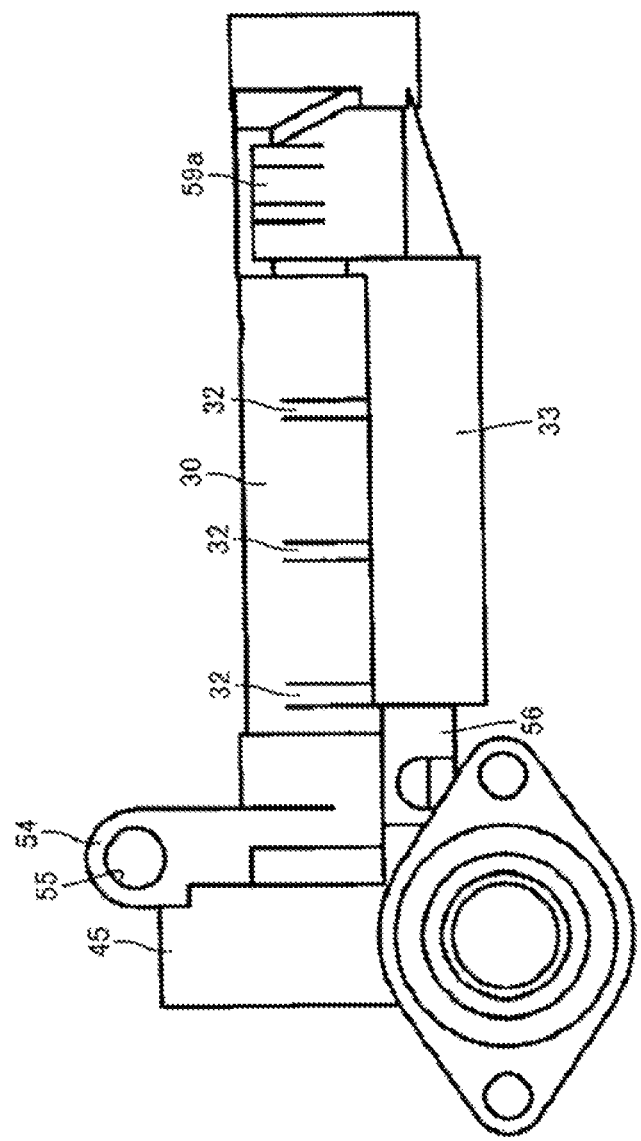
FIG. 4 is a front view of a single molded resin part of the first example of the first embodiment, wherein a gear housing, lower support bracket, sensor housing, outer column and upper support bracket are integrally molded using synthetic resin.
Figure 7:
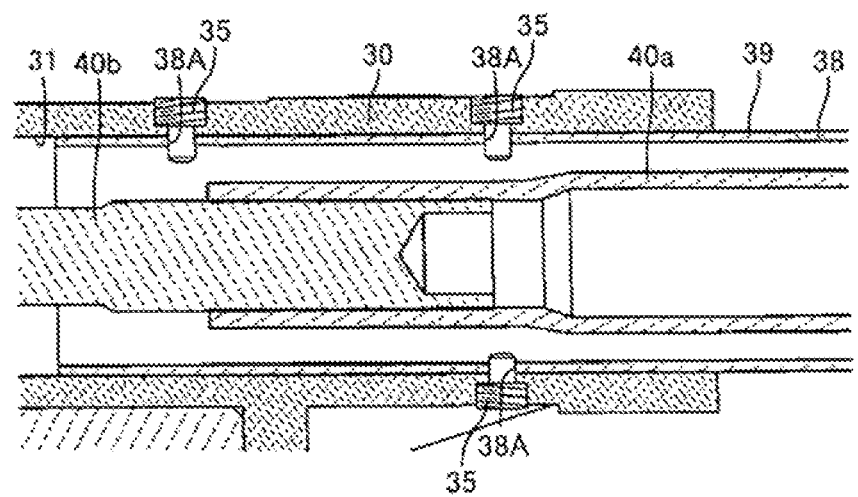
FIG. 7 is an enlarged vertical cross-sectional view illustrating the fitting section between the outer column and inner column in FIG. 3.
Figure 8:
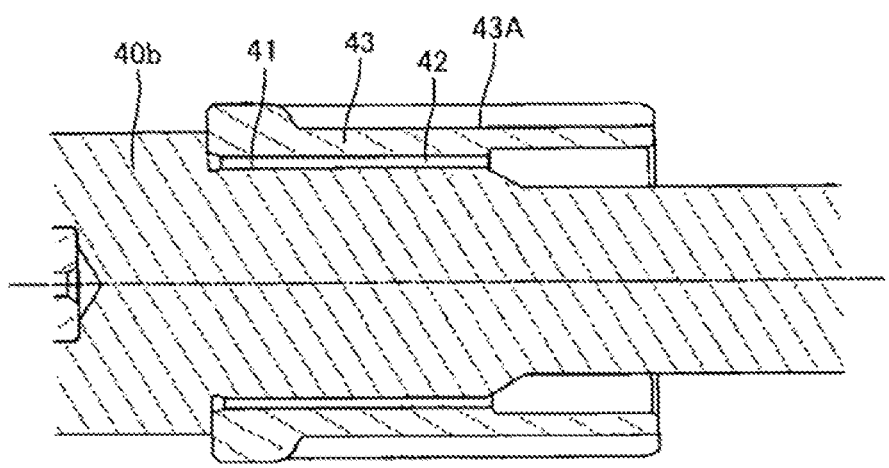
FIG. 8 is an enlarged vertical cross-sectional view illustrating the joined section between the lower steering shaft and key-lock collar in FIG. 3.

As illustrated in FIG. 3, the upper portion of the steering shaft 40a is supported by the inner column 38 such that it can rotate, and the steering wheel 1 is fastened to the rear end section of the upper steering shaft 40*a*. Female serrations are formed around the vehicle-front side of the upper steering shaft 40*a*, and these serrations engage with male serrations that are formed around the vehicle-rear side of the lower steering column 40*b* with a serration fit. Therefore, the upper steering shaft 40*a* and the lower steering shaft 40*b* engage so that rotational torque is freely transmitted and so that relative displacement in the axial direction is possible. Consequently, the upper steering shaft 40*a* and the lower steering shaft 40*b* can reduce the length overall thereof by relative movement of this engagement section during a collision.

Figure 45:
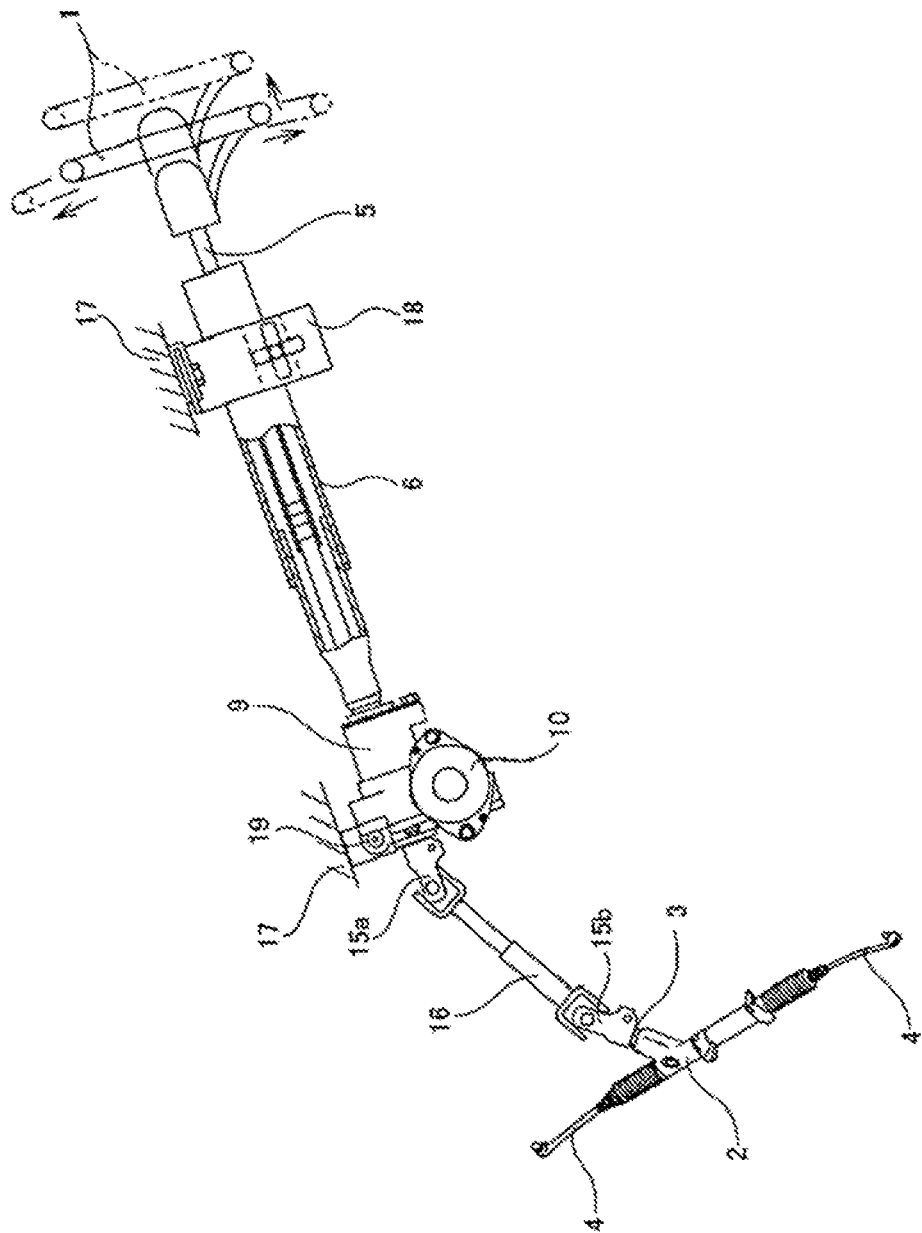
FIG. 45 is a partial cross-sectional side view illustrating a first example of an electric power steering apparatus.
Figure 46:
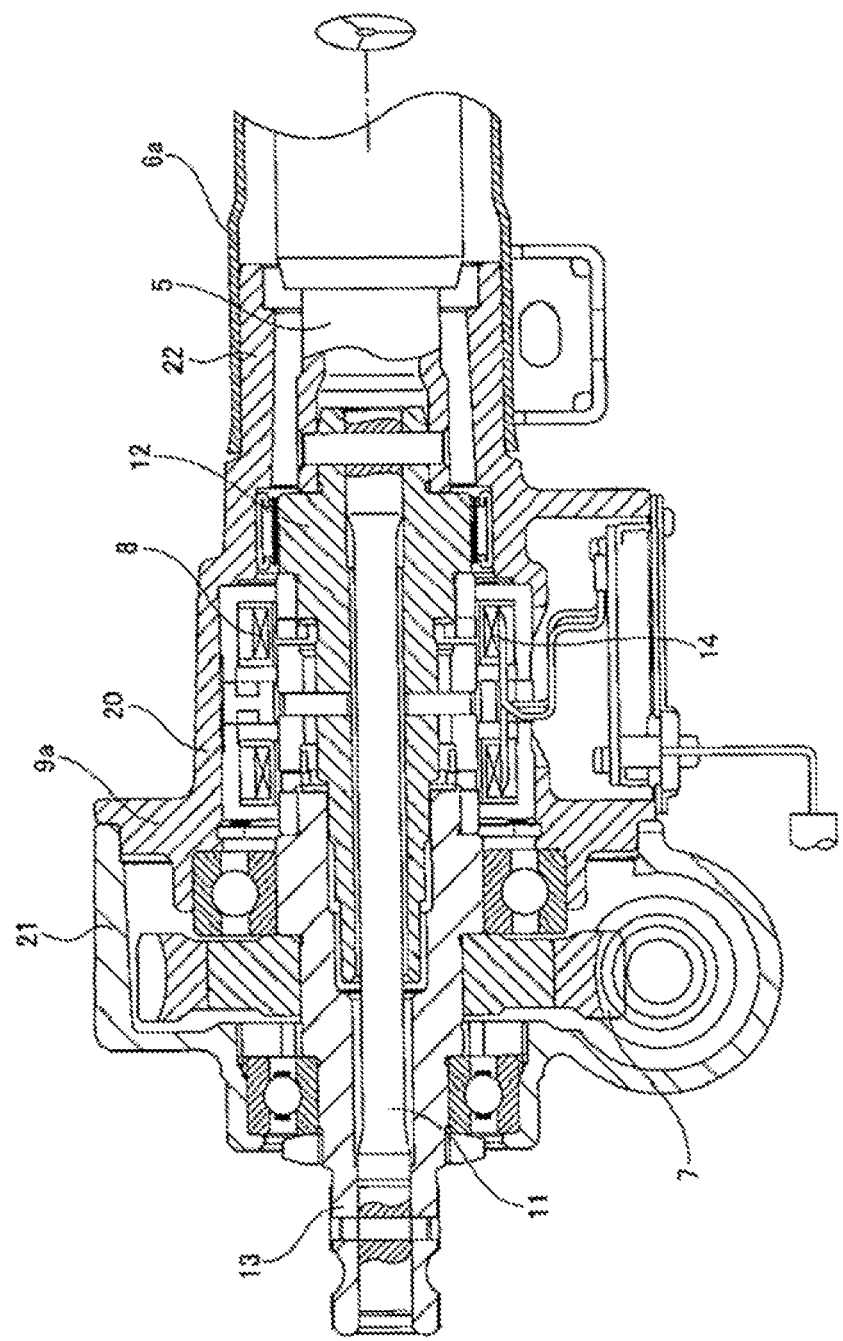
FIG. 46 is a cross-sectional view illustrating the major parts of a first example of conventional construction of column unit for an electric power steering apparatus.
Figure 47:
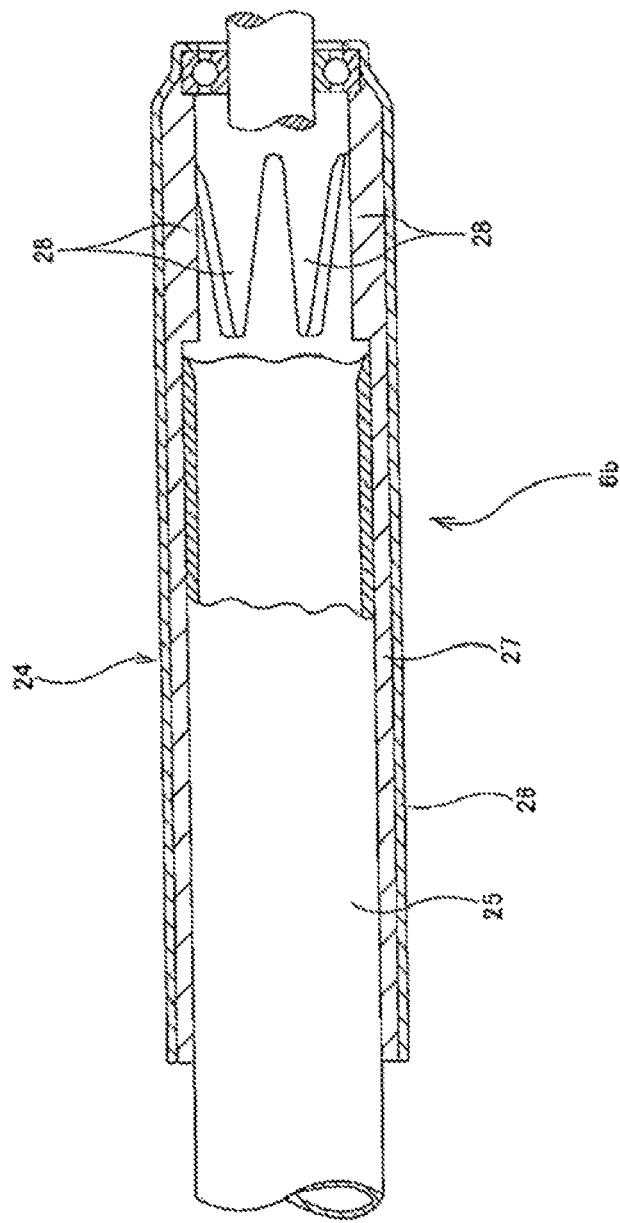
FIG. 47 is a cross-sectional view illustrating another example of conventional construction of column unit for an electric power steering apparatus.

The front end section of the lower steering shaft 40*b* is joined to the rear end section of the output shaft 46 of the electric power assist mechanism (steering assist unit). The output shaft 46 protrudes from the end surface on the vehicle-front side of the gear housing 45, and is connected to the to the rear end section of the intermediate shaft 16 by way of a universal joint 15*a* (FIG. 45).

The output shaft 46 is supported in the gear housing 45 by bearings 47*a*, 47*b* such that it can rotate, and the lower steering shaft 40*b* and output shaft 46 are connected by a torsion bar 48. A worm wheel 49 is attached to the output shaft 46, and the worm 50 engages with the worm wheel 49, forming a reducer. An electric motor 51 is fastened to the gear housing 45, and the worm 50 is connected to the rotating shaft (not illustrated in the figures) of this electric motor 51.

Moreover, a torque sensor (displacement sensor) 57 that comprises a torque measurement apparatus and that detects torsion of the torsion bar 48 is provided around the right side of the output shaft 46. The torque sensor 57 detects the direction and size of torque applied to the lower steering shaft 40*b* from the steering wheel 1. The electric motor 51 is driven according to this detected signal, causing an assist torque having a specified size and direction to be applied to the output shaft 46 by way of the worm 50 and worm wheel 49. The torque sensor 57 is housed inside the sensor housing 56 that is integrally formed with the outer column 30, and a cable from the torque sensor 57 runs to the outside through an opening in the sensor housing 56.

As illustrated in FIG. 3, FIG. 8 and FIGS. 9A, 9B, a key-lock collar 43 is installed around the outer circumferential surface 41 of the lower steering shaft 40*b* by way of a tolerance ring 42. Moreover, a steering lock apparatus 44 is fastened to a steering lock apparatus installation section 33 on the bottom surface of the outer column 30, and when the ignition key is removed from the key hole in the locked position, the locking key (not illustrated in the figures) engages with a groove 43A in the key-lock collar 43, which fastens the lower steering shaft 40*b* to the outer column 30, and prevents rotation of the lower steering shaft 40*b*.

Figure 9B:
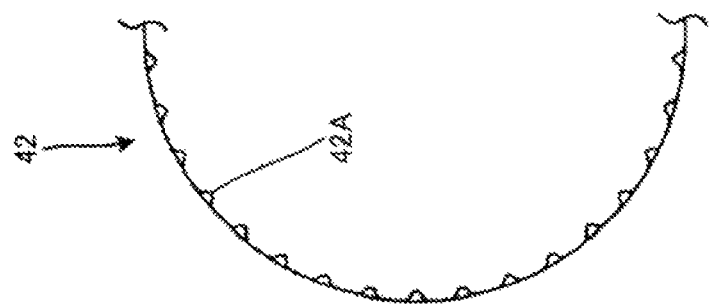
FIG. 9B is a right side view of FIG. 9A.
Figure 9A:
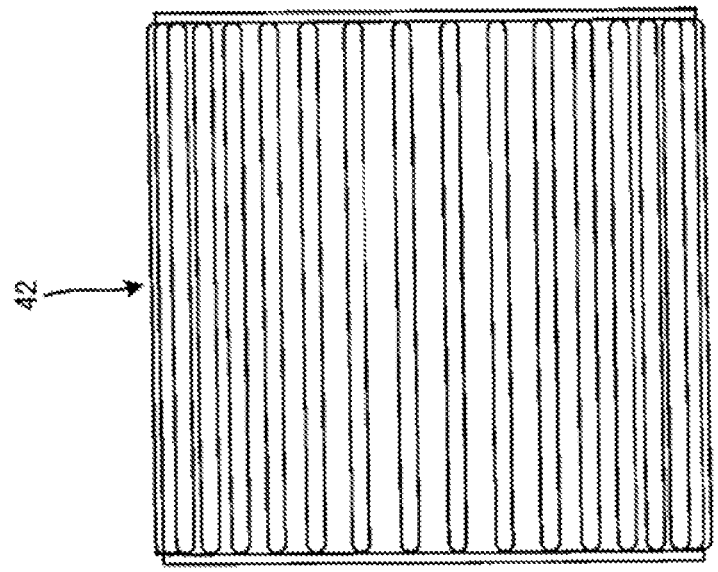
FIG. 9A is a front view of the tolerance ring in FIG. 8.

FIGS. 9A and 9B illustrate the tolerance ring 42, where FIG. 9B is a right side view of FIG. 9A, and illustrates the tolerance ring 42 with the rear half thereof omitted. The tolerance ring 42 is formed into a ring shape using a thin plate made of spring steel, and wave-shaped uneven sections are formed at uniform angular intervals around the ring-shaped outer surface. Convex sections 42A on the inner circumferential side of the tolerance ring 42 come in contact with the outer circumferential surface 41 of the lower steering shaft 40*b*, and by elastically deforming toward the outside in the radial direction, the key-lock collar 43 is fastened to the outer circumferential surface 41 of the lower steering shaft 40*b*.

The force with which the tolerance ring 42 fastens the key-lock collar 43 is found from the height in the radial direction of the convex sections 42A on the inner circumferential side, the interval (pitch) in the circumferential direction of the convex sections 42A on the inner circumferential side, the plate thickness of the spring steel, and the friction coefficient between the outer surface of the tolerance ring 42 and the inner surface of the key-lock collar 43. Therefore, in the key locked state, when an excessively large twisting moment is applied to the lower steering shaft 40*b*, the height in the radial direction of the convex sections 42A on the inner circumferential side, the interval in the circumferential direction of the convex sections 42A on the inner circumferential side, and the plate thickness of the spring steel are set so that the key-lock collar 43 can rotate around the outside of the tolerance ring 42. As a result, excessive loading applied to the lower support bracket 54, outer column 30 and upper support bracket 59*a* that are integrally molded using synthetic resin that is not ideal for strength is reduced, preventing damage, and prevents theft of the automobile.

As illustrated in FIG. 1, FIG. 2, FIG. 4 and FIG. 5, a plurality of ribs are integrally formed around the outer circumferential surface of the outer column 30 near the steering lock apparatus installation section 33. Therefore, in the key locked state, when an excessively large twisting moment is applied to the lower steering shaft 40*b*, torsional deformation of the outer column 30 is prevented.

The key-lock collar 43 and steering lock apparatus 44 are located between the lower support bracket 54 and the upper support bracket 59*a*. Therefore, in the key locked state, the reaction force when a twisting load is applied to the lower steering shaft 40*b* can be supported by both the lower support bracket 54 and the upper support bracket 59*a*, and the load can be dispersed.

As illustrated in FIG. 3, FIG. 6A, FIG. 6B and FIG. 7, protruding sections 34 that protrude toward the inside in the radial direction from the inner circumferential surface 31 are formed at intervals of 90° on the inner circumferential surface 31 of the outer column 30, so as to extend along the entire length in the axial direction. The inner diameter dimension of the protrusions 34 is a little less than the outer diameter dimension of the outer circumferential surface 39 of the inner column 38, and set so that the inner column 38 fits inside the outer column 30 with small interference.

The inner-diameter dimension of the protrusions 34, due to the effect of the draft angle of the core when forming the outer column 30, are formed so that the inner diameter dimension D1 of the vehicle-rear side (right side of FIG. 6A) is smaller than the inner-diameter dimension D2 of the vehicle-front side (left side of FIG. 6A). Therefore, the inner column 38 is such that the interference of the vehicle-front side is somewhat larger than that of the vehicle-rear side. However, due to the effect of the draft angle of the core, the tooth thickness at the top of the protrusion 34 is less on vehicle-front side than on the vehicle-rear side, so the outer column 30 tightly holds the inner column 38 with a nearly uniform fastening force along the entire length. In the case where the length of the fit between the outer column 30 and inner column 38 is short, the inner-diameter dimension D1 of the vehicle-rear side of the protrusions 34 and the inner-diameter dimension D2 of the vehicle-front side can be the same.

The outer circumferential surface 39 of the inner column 38 is fastened by way of the protrusions 34 that are formed at uniform intervals around the inner circumferential surface 31 of the outer column 30 in this way, so it becomes easy to fasten the outer circumferential surface 39 of the inner column 38 with a specified interference force. Therefore, the required support rigidity of the inner column 38 and steering wheel 1 for normal operation can be obtained, and it becomes easy to set the collapse load when the inner column 38 collapses to a specified value. In this example, protrusions 34 are formed on the inner circumferential surface 31 of the outer column 30, however, alternatively, it is possible to easily fasten the outer circumferential surface 39 of the inner column 38 with a specified interference force by making the inner circumferential surface 31 of the outer column 30 a cylindrical surface, and to form protrusions on the outer circumferential surface 39 of the inner column 38.

After the inner column 38 has been fitted inside the outer column 30, the inner column 38 is fastened to the outer column 30 by three synthetic resin shear pins 35 that are separated in the axial direction. Male screw threads are formed on the shear pins 35, and the shear pins 35 are screwed into female screw holes that are formed in the outer column 30 and fastened. The tip ends of the shear pins 35 are inserted into through holes 38A (FIG. 7) that are formed in the inner column 38. After that, the shear pins 35 are heated while at the same time pressure is applied to the pins (thermal swaging), which further prevents the shear pins 35 from coming loose.

When the driver collides with the steering wheel 1 during a secondary collision and a large impact force acts on the shear pins 35, the shear pins 35 shear and the inner column 38 collapses toward the front of the vehicle, being guided by the protrusions 34. As illustrated in FIG. 3 and FIGS. 6A, 6B, impact absorbing protrusions 36 are formed around the inner circumferential surface 31 of the outer column 30 further on the vehicle-front side than the vehicle-front end of the inner column 38, and being separated at 90° intervals, protrude toward the inside in the radial direction from the inner circumferential surface 31. The impact absorbing protrusions 36 are formed such that they are shifted by a phase of 45° with respect to the protrusion 34.

The inner-diameter dimension D3 of the impact absorbing protrusions 36 is a little smaller than the inner-diameter dimensions D1, D2 of the protrusions 34, and the tooth thickness of the impact absorbing protrusions 36 becomes gradually larger going toward the front of the vehicle. Therefore, when the inner column 38 collapses toward the front of the vehicle, the sliding resistance gradually becomes greater, and the amount of impact energy that is absorbed increases in the latter half of the collapsing movement, so the absorption of impact energy is completed in a short collapsing movement. This kind of construction is particularly suitable to a column assist type electric power steering apparatus having a short collapse amount.

Figure 10:
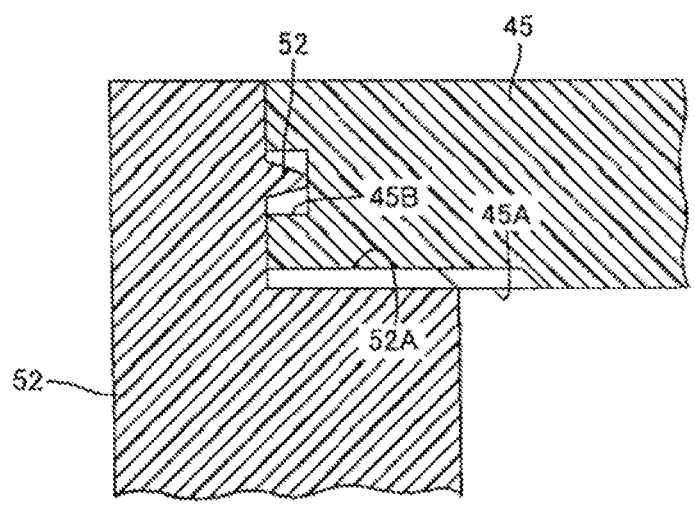
FIG. 10 is an enlarged cross-sectional view illustrating the joined section between the gear housing and front cover in FIG. 3.

As illustrated in FIG. 3 and FIG. 10, a front cover 52 made of synthetic resin is attached to the end surface on the vehicle-front side of the gear housing 45, and together with sealing the end surface on the vehicle-front side of the gear housing 45, supports the outer race of the bearing 47a. Male screws 52A of the front cover 52 are screwed into female screw holes 45A in the vehicle-front side of the gear housing 45. After the ring-shaped convex section 52B of the front cover 52 has been inserted into the ring-shaped groove section 45B of the gear housing 45, and while pressure is applied to the joining surfaces of the ring shaped convex section 52B and ring shaped groove 45B, the surfaces are melted and fused together (ultrasonic bonding). By fusing the front cover 52, it is possible to prevent the front cover 52 from becoming loose, and it is possible to improve the seal between the joining surfaces of the front cover 52 and gear housing 45.

In this example, it is also possible to integrally mold only the gear housing 45 and outer column 30 using synthetic resin, and to connect the other members of the column unit that were formed separately to this molded part. Moreover, it is also possible to integrally mold the gear housing 45, outer column 30, lower support bracket 54 and sensor housing 56 using synthetic resin, and to connect the separate upper support bracket 59a to this molded part. In this example, as long as at least the gear housing 45 and the outer column 30 are integrally molding together, whether the other members are integrally molded or formed separately is arbitrary, and not limited to the combinations above. Furthermore, it is also possible to integrally mold together the outer column 30, lower support bracket 54 and upper support bracket 59a using synthetic resin, and to connect the separate gear housing 45 and sensor housing 56 to this molded part. Moreover, instead of the lower support bracket 54 being directly connected to the vehicle-front side of the outer column 30, the lower support bracket 54 can be connected to an arbitrary position of a housing that comprises the gear housing 45 and sensor housing 56, and the present invention can be applied to this kind of construction as well.

FIG. 11 to FIG. 18 illustrate a second example of the first embodiment of the present invention. The column unit for an electric power steering apparatus of this example is applied to an electric power steering apparatus that does not have a telescopic mechanism, but has a tilt mechanism. In this example, the outer column 30, lower support bracket 54, gear housing (reduction gear box) 45 and sensor housing 56 are integrally molded together using synthetic resin mixed with glass fiber.

The lower support bracket 54 is supported by the vehicle body by way of a pivot pin (not illustrated in the figures) that is inserted into the installation hole 55 such that tilting is possible. In this example, the upper support bracket 59b, which is made of steel and is formed as a separate part from the outer column 30, is supported by and fastened to the vehicle body. The upper support bracket 59b comprises a top plate 61 and a pair of side plates 62 that extend downward toward the vehicle-bottom side from the top plate 61. A long installation hole 63 is formed in the top plate 61, and an installation bolt (not illustrated in the figures) is inserted into this installation hole 63 so that the installation surface 61A on the vehicle-top side of the top plate is supported by and fastened to the vehicle body.

As illustrated in FIG. 13 to FIG. 18, a distance bracket 37 that protrudes toward the vehicle-top side is integrally formed on the vehicle-rear end of the outer column. The outside surface of the distance bracket 37 comes in sliding contact with the inside surfaces of the side plates 62 of the upper support bracket 59b.

Figure 14:
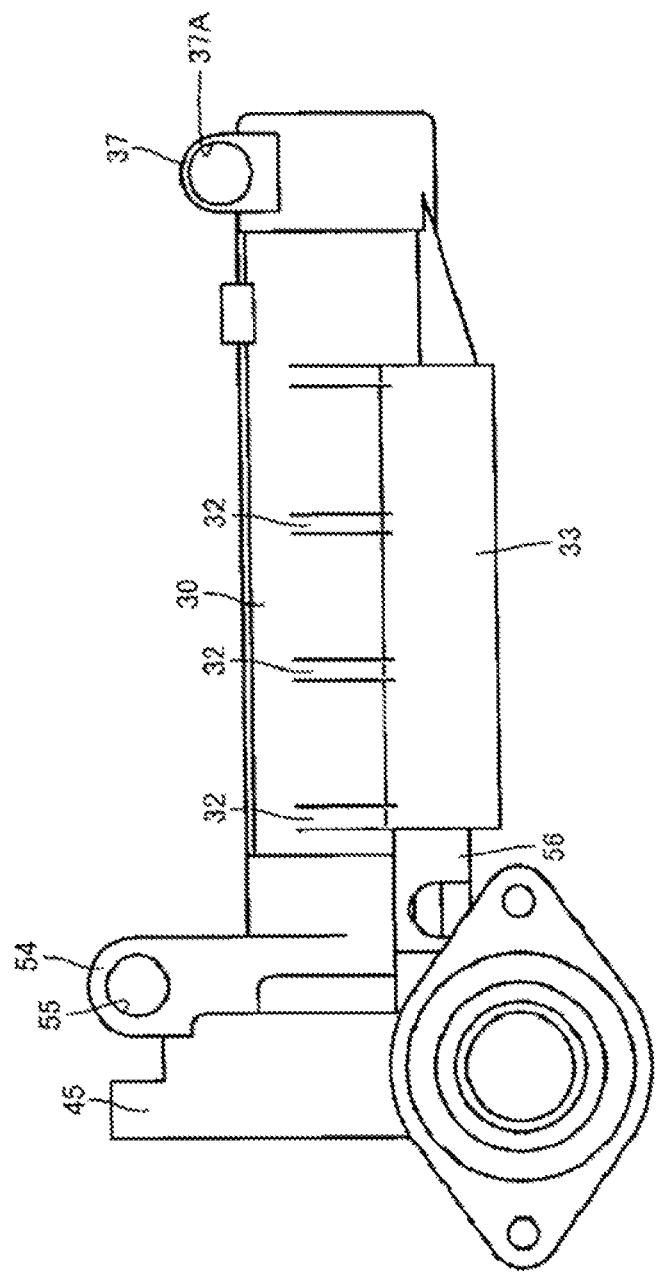
FIG. 14 is a front view of a single molded resin part of the second example of the first embodiment, wherein a gear housing, lower support bracket, sensor housing and outer column are integrally molded using synthetic resin.
Figure 15:
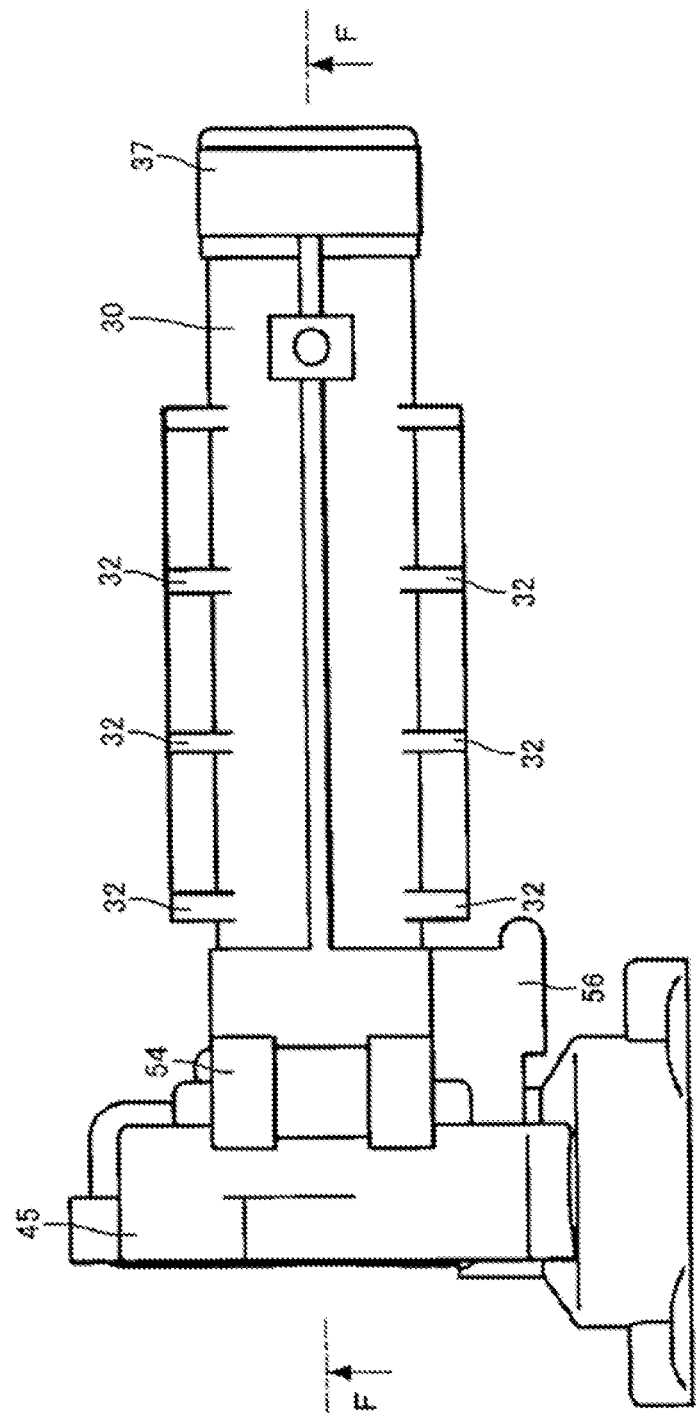
FIG. 15 is a top view of FIG. 14.
Figure 16:
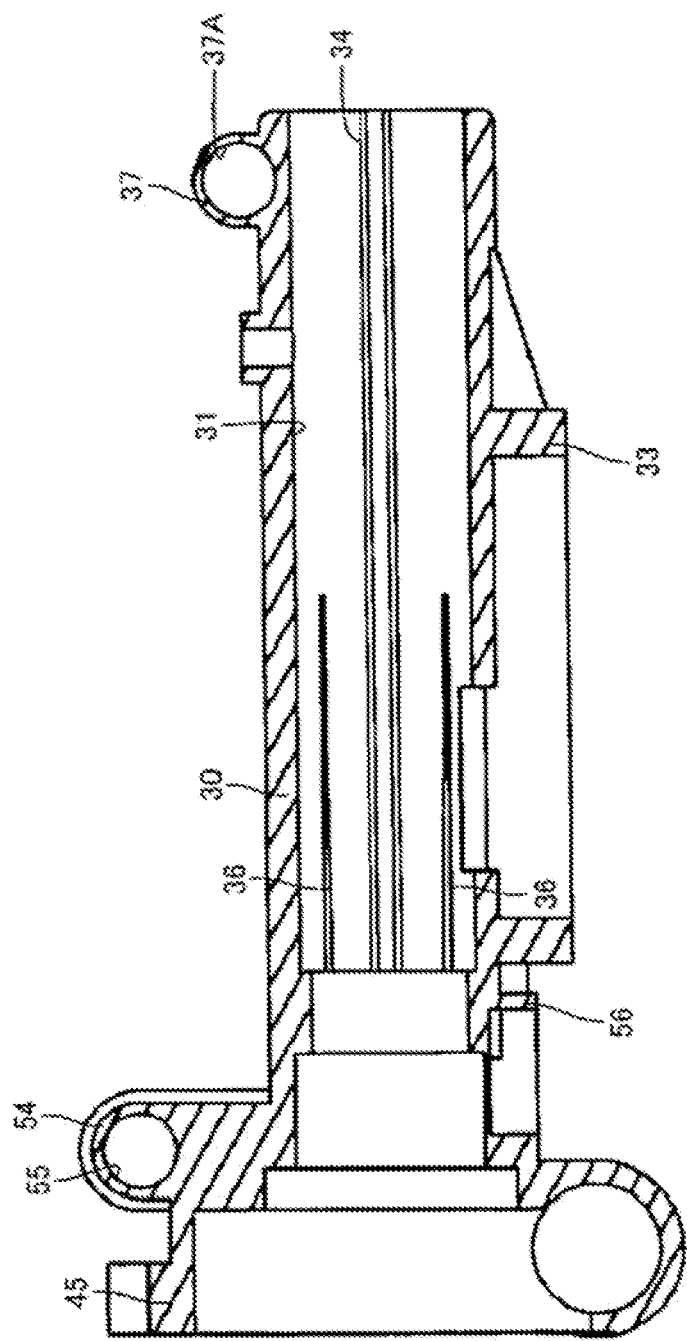
FIG. 16 is a cross-sectional view of section F-F in FIG. 15.

Long tilt adjustment grooves 64 are formed in both of the side plates 62. The long tilt adjustment grooves 64 are formed in a circular arc shape around the pivot pin of the lower support bracket 54. A round hole 37A that extends in a direction orthogonal to the paper in FIG. 14 and FIG. 16 is formed in the distance bracket 37. A hollow cylindrical shaped steel sleeve 37B is pressure fitted into the round hole 37, and the outside surface of the sleeve 37B is formed so as to protrude a little further than the outside surface of the distance bracket 37.

Figure 17:
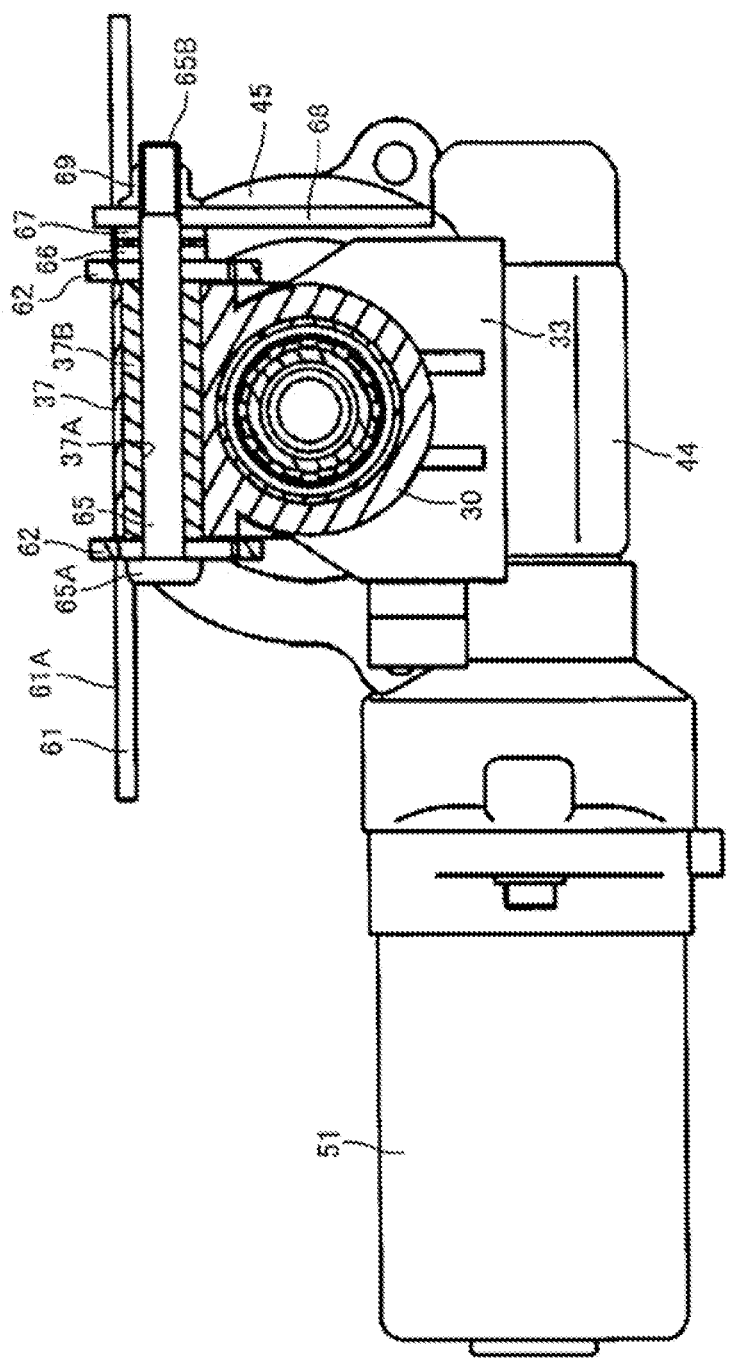
FIG. 17 is a cross-sectional view of section G-G in FIG. 12.
Figure 18:
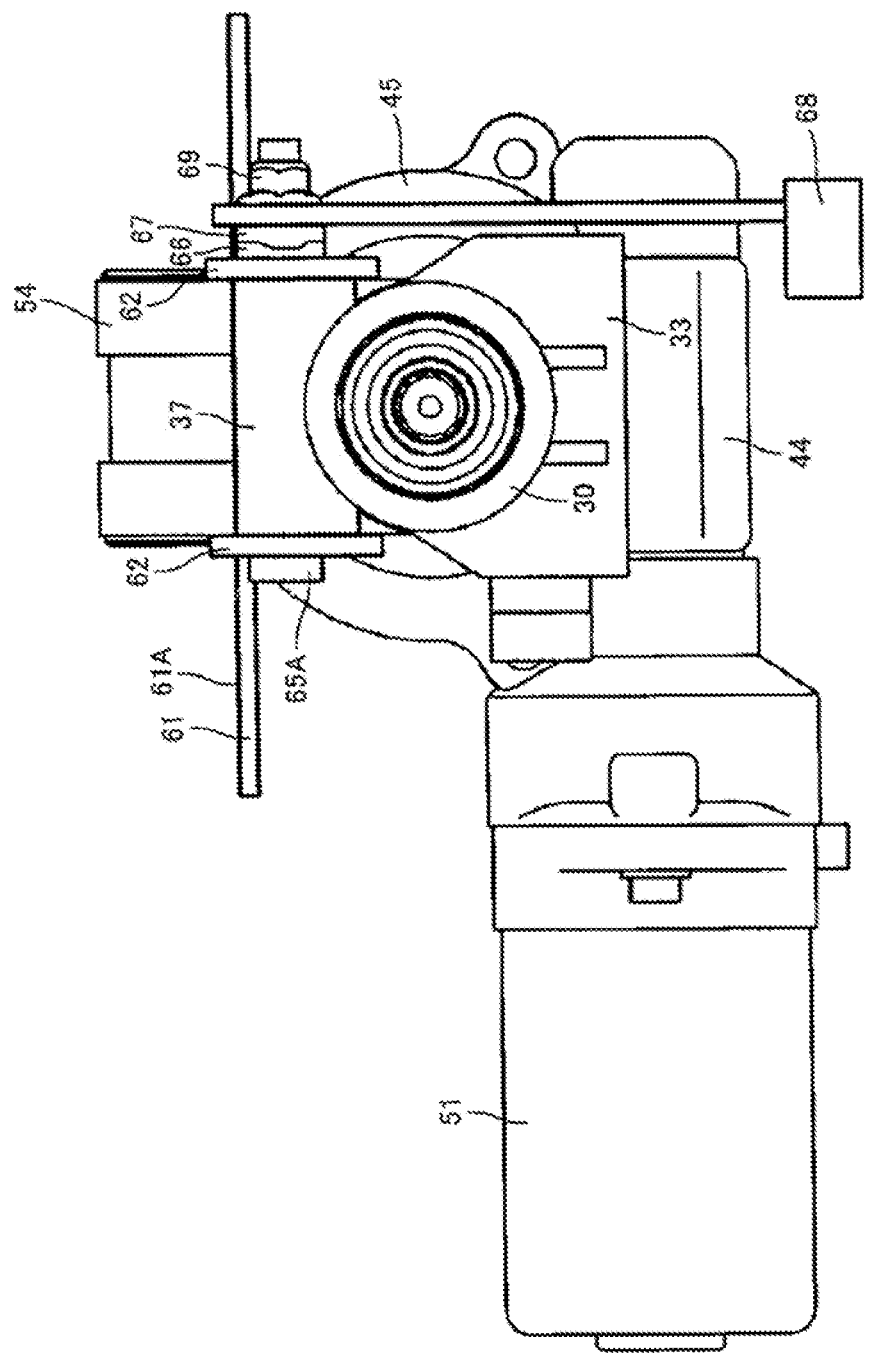
FIG. 18 is a right side view of FIG. 12.

A round bar shaped tightening rod 65 is inserted through the long tilt adjustment groove 64 and round hole 37A from the left side in FIG. 17. A disk shaped head section 65A is formed on the left end of the tightening rod 65. A stationary cam 66, movable cam 67, operation lever 68 and nut 69 are fitted in this order around the outer surface of the right end of the tightening rod 65, and the female screw (not illustrated in the figures) that is formed in the inner-diameter section of the nut 69 is screwed onto the male screw 65B that is formed on the right end of the tightening rod 65.

Complementary inclined cam surfaces are formed on opposing end surfaces of the stationary cam 66 and the movable cam 67, and these surfaces engage with each other. When an operation lever 68 that is connected to the right side surface of the movable cam 67 is operated by hand, the movable cam 67 rotates with respect to the stationary cam 66.

When the operation lever 68 is rotated in the clamping direction, the peak of the inclined cam surface of the movable cam 67 runs upon the peak of the inclined cam surface of the stationary cam 66, while pulling the tightening rod 65 to the right side of FIG. 17 and pushing the stationary cam 66 to the left side of FIG. 17. The side plate 62 on the left side is pushed to the right side by the right end surface of the head section 65A of the tightening rod 65, causing the side plate 62 to deform to the inside, and strongly pressing the inside surface of the side plate 62 against the outside surface of the sleeve 37B.

At the same time, the side plate on the right side is pushed toward the left side by the left end surface of the stationary cam 66, causing the side plate 62 to deform toward the inside, and strongly pressing the inside surface of the side plate 62 against the outside surface of the sleeve 37B. In this way, it is possible to firmly tighten the sleeve 37B of the outer column 30 to the upper support bracket 59b. The outside surface of the steel sleeve 37B is used for tightening, so durability of the outer column 30 made of resin is improved. Therefore, the outer column 30 is fastened to the upper support bracket 59b and displacement in the tilt direction of the outer column 30 is prevented. The distance bracket 37 is formed on the vehicle-top side of the outer column 30, and the distance between the center axis of the sleeve 37B and the installation surface 61A is set to be short, so the rigidity for attaching the outer column 30 to the vehicle body is large.

Next, as the driver rotates the operation lever 68 in the loosening direction, the side plates 62 of the upper support bracket 59b, the space between which in the free state is set to be wider than the dimension in the vehicle-width direction of the outside surface of the sleeve 37B, elastically return in opposite directions from the clamping direction.

The outer column 30 is then in the free state with respect to the side plates 62 of the upper support bracket 59b, so the tightening rod 65 can be displaced in the tilt direction being guided by the long tilt adjustment grooves 64, and the steering wheel 1 can be arbitrarily adjusted in the tilt direction.

Figure 11:
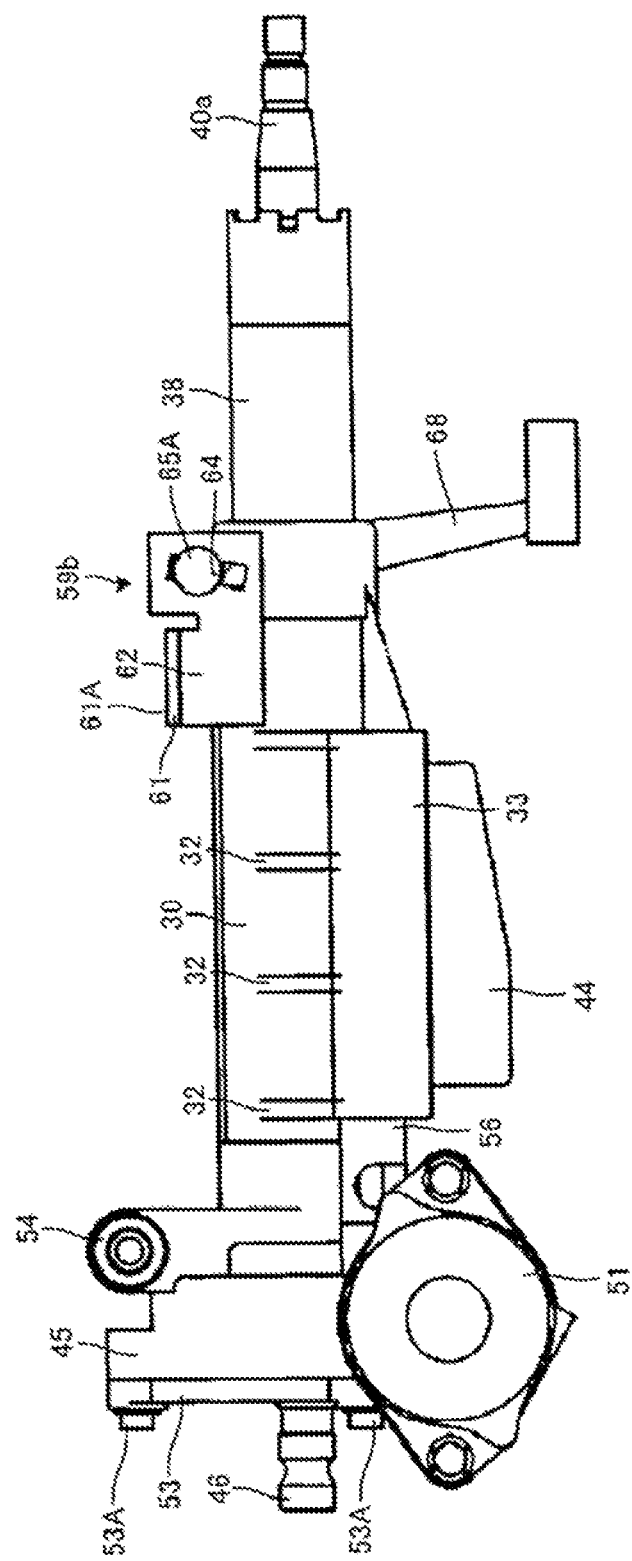
FIG. 11 illustrates a second example of the first embodiment of a column unit for an electric power steering unit of the present invention, and is a front view as seen from the side of the vehicle body.
Figure 12:
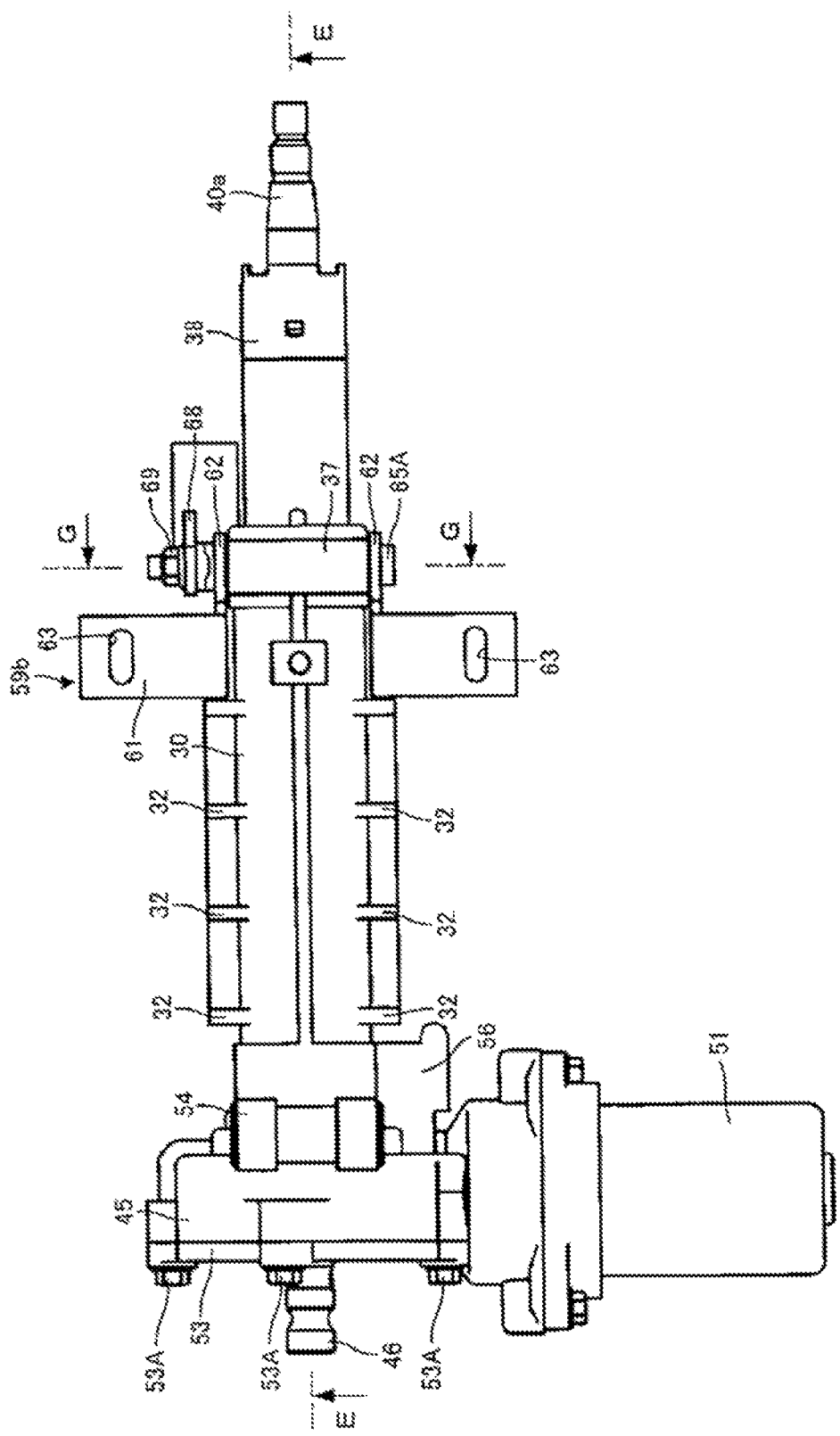
FIG. 12 is a top view of FIG. 11.
Figure 13:
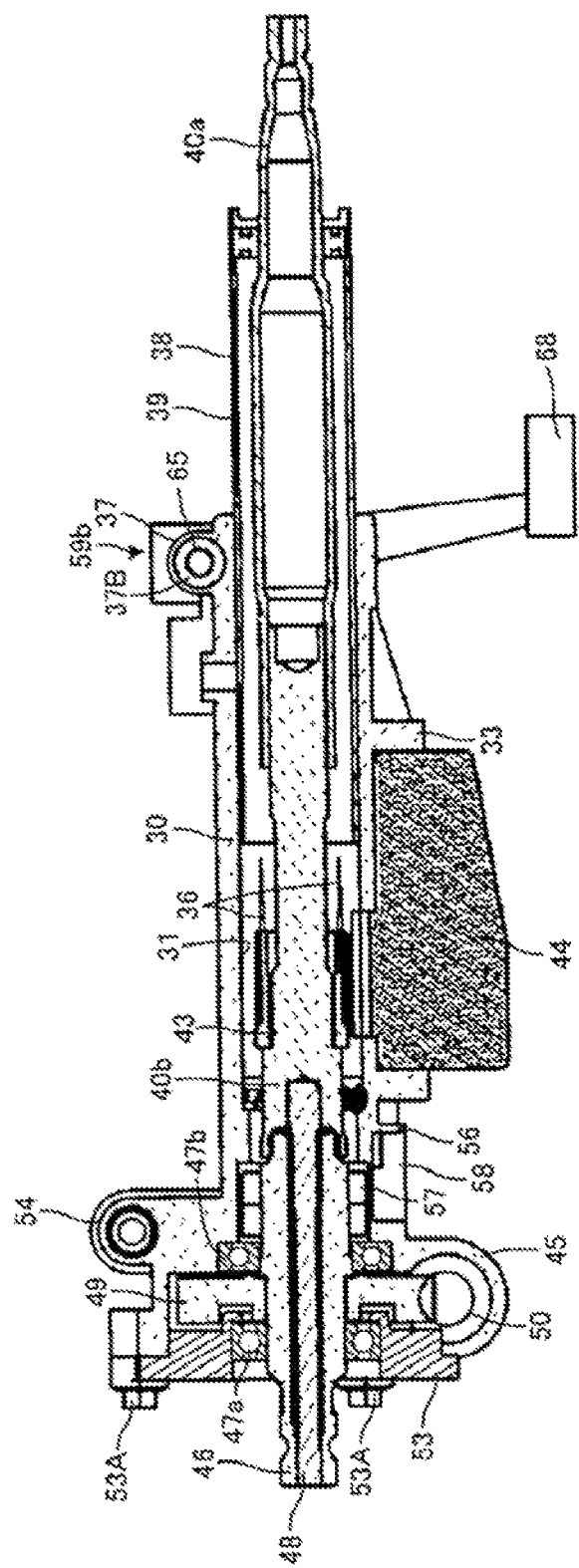
FIG. 13 is a cross-sectional view of section E-E in FIG. 12.

In this example, as illustrated in FIG. 11 to FIG. 13, a front cover 53 made of an aluminum alloy or synthetic resin is attached to the end surface on the vehicle-front side of the gear housing 45, and together with sealing the end surface on the vehicle-front side of the gear housing 45, supports the outer race of the bearing 47a. The front cover 53 is fastened to the gear housing by bolts 53A. In order to lighten the weight, the bolts 53A are preferably made of an aluminum alloy or synthetic resin. The construction and function of the other parts are the same as in the first example of the first embodiment.

In this first embodiment, examples of applying the column unit of the present invention to an electric power steering apparatus that does not comprise either a tilt mechanism or a telescopic mechanism, and to an electric power steering apparatus comprising only a tilt mechanism were explained, however, the present invention can also be applied to a tilt and telescopic type electric power steering apparatus that comprises both a tilt mechanism and telescopic mechanism.

FIG. 19 to FIG. 25 illustrate a first example of a second embodiment of the present invention. The column unit for an electric power steering apparatus of this example, as in the first example of the first embodiment, is applied to an electric power steering apparatus that does not comprise a tilt mechanism or a telescopic mechanism.

In the column unit of this example as well, the outer column 30, the lower support bracket 54, the upper support bracket 59a, the gear housing (reduction gear box) 45 and sensor housing (torque sensor housing) 56 are integrally molded of synthetic resin mixed with glass fibers. A particular feature of the column unit of this example is the construction for attaching the column unit to the vehicle body.

Figure 19:
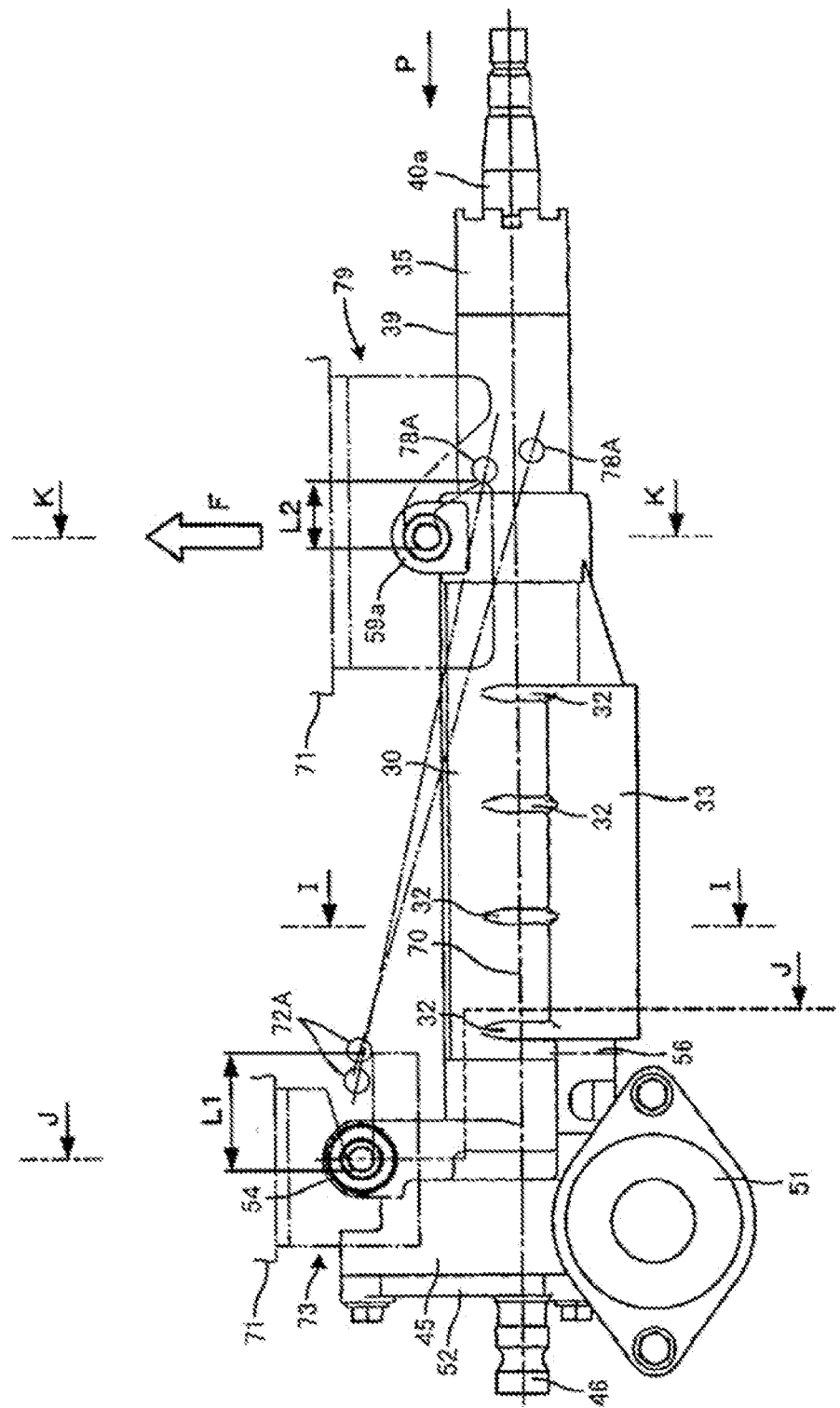
FIG. 19 illustrates a first example of a second embodiment of a column unit for an electric power steering unit of the present invention, and is a front view as seen from the side of the vehicle body.

The lower support bracket 54 is integrally formed on the vehicle-front side of the outer column 30 and protrudes upward toward the vehicle-top side from the outer column 30 (upward in FIG. 19). The lower support bracket 54 is fastened to a lower vehicle installation plate 73 by a lower installation bolt 72 that is inserted though a lower installation hole (bolt hole) 55 (FIG. 21) that is formed in the lower support bracket 54. The lower installation bolt 72 is made of metal such as steel.

The lower installation hole 55 is formed in the lower support bracket 54 such that it is parallel with the horizontal axis line (axis line that is orthogonal to the surface of the paper in FIG. 19) that is orthogonal to the center axis line 70 of the outer column 30. The lower vehicle installation plate 73 is made of metal such as steel, and the top end thereof is fastened to the vehicle body 71, and both sides in the vehicle-width direction of the lower support bracket 54 are held between a pair of side plates 73A of the lower vehicle installation plate 73 that extend downward from the vehicle body 71.

Figure 21:
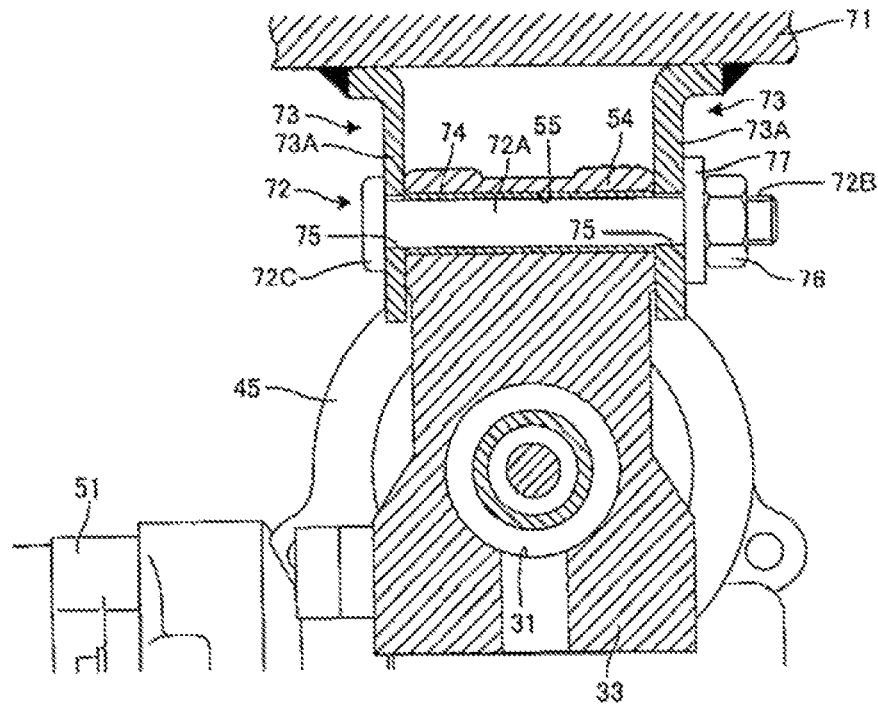
FIG. 21 is a cross-sectional view of section J-J in FIG. 20.
Figure 22:
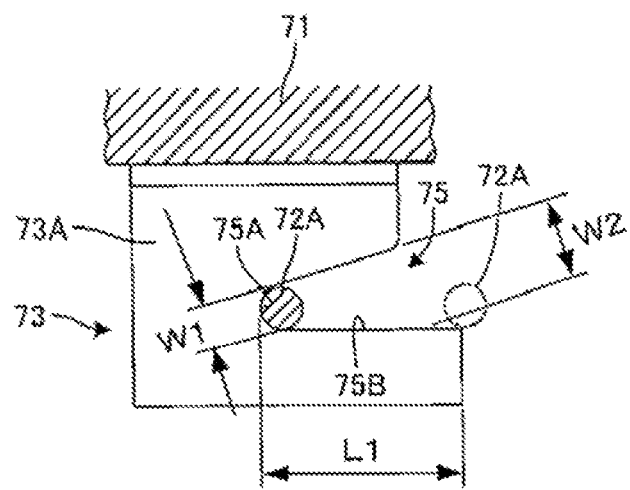
FIG. 22 is a front view of the lower vehicle body installation plate in FIG. 19, as seen from the side of the vehicle body.

A hollow cylindrical shaped sleeve 74 made of metal such as steel fits around the shaft section 72A of the lower installation bolt 72, and the outer circumferential surface of the sleeve 74 fits inside the lower installation hole 55. As illustrated in FIG. 21 and FIG. 22, lower notch grooves 75 are formed in the side plates 73A of the lower vehicle installation plate 73, and the shaft section 72A of the lower installation bolt 72 is inserted through the lower notch grooves 75. The lower notch grooves 75 are closed on the vehicle-front side, and are open on the vehicle-rear side. Moreover, the width of the grooves in the vertical direction of the vehicle of the lower notch grooves 75 is such that groove width W2 on the vehicle-rear side is wider than the groove width W1 on the vehicle-front side, so that the groove width gradually becomes wider going from the vehicle-front side toward the vehicle-rear side.

A nut 76 is screwed onto the male screw 72B on the right end of the shaft section 72A of the lower installation bolt 72, so that the side plates 73A are held between the head section 72C on the left end of the shaft section 72A and a washer 77, and the inside surfaces of the side plates 73A firmly press against the outside surface of the sleeve 74. By firmly fastening the metal sleeve 74 to the lower vehicle installation plate 43 in this way, it is possible for the lower support bracket 54 to be supported by and fastened to the vehicle body. The outside surface of the metal sleeve 74 is used for fastening, so the durability of the lower support bracket 54 made of resin is improved.

Similarly, the upper support bracket 59*a* is integrally formed on the vehicle-rear side of the outer column 30, and protrudes upward toward the vehicle-top side (top side in FIG. 19) from the outer column 30. The upper support bracket 59*a* is fastened to an upper vehicle installation plate 79 by an upper installation bolt 78 that is inserted through an upper installation hole (bolt hole) 60 (FIG. 24) that is formed in the upper support bracket 59*a*. The upper installation bolt 78 is made of metal such as steel.

The upper installation hole 78 is formed in the upper support bracket 59*a* such that it is parallel with the horizontal axis line (axis line that is orthogonal to the surface of the paper in FIG. 19) that is orthogonal to the center axis line 70 of the outer column 30. The upper vehicle installation plate 84 is made of metal such as steel, and the top end thereof is fastened to the vehicle body 71, and a pair of side plates 79A of the upper vehicle installation plate 79 that extend downward from the vehicle body 71 hold both sides in the vehicle-width direction of the upper support bracket 59*a*.

Figure 24:
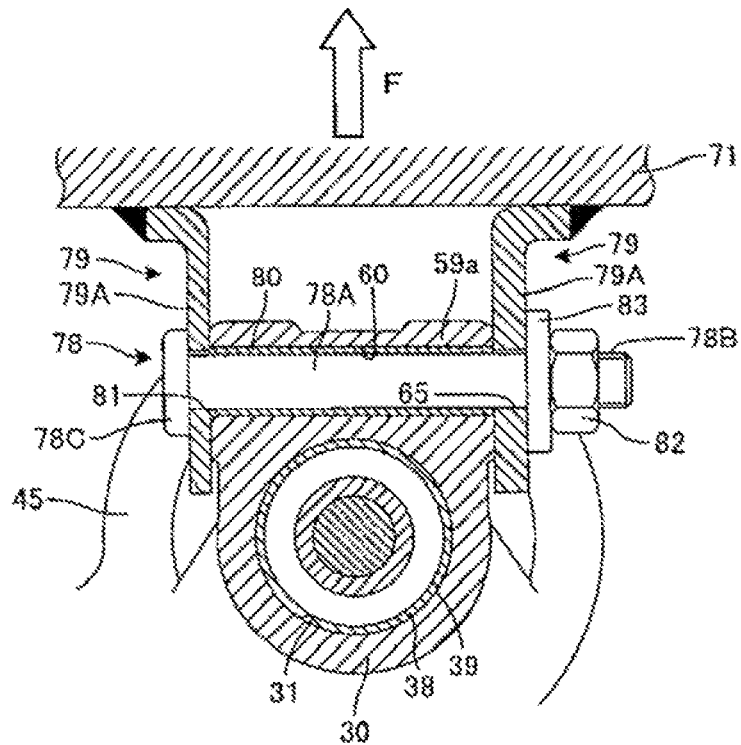
FIG. 24 is a cross-sectional view of section K-K in FIG. 19.
Figure 25:
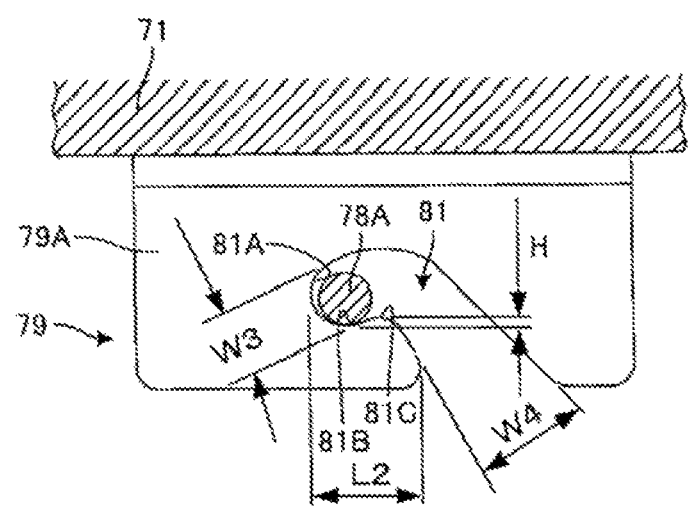
FIG. 25 is a front view of the upper vehicle body installation plate in FIG. 19, as seen from the side of the vehicle body.

A hollow cylindrical shaped sleeve 80 made of metal such as steel fits around the outside of the shaft section 78A of the upper installation bolt 78, and the outer circumferential surface of the sleeve 80 fits inside the upper installation hole 78. As illustrated in FIG. 24 and FIG. 25, upper notch grooves 81 are formed in the side plates 79A of the upper vehicle installation plate 89, and the shaft section 78A of the upper installation bolt 78 is inserted through the upper notch grooves 81. The upper notch grooves 81 are closed on the vehicle-front side, and open on the vehicle-rear side.

Moreover, the width of the grooves in the vertical direction of the vehicle of the upper notch grooves 81 is such that groove width W4 on the vehicle-rear side is wider than the groove width W3 on the vehicle-front side, so that the groove width gradually becomes wider going from the vehicle-front side toward the vehicle-rear side. Furthermore, a convex section 81C that protrudes upward toward the vehicle-top side is formed on a portion of the edge section 81 B of the vehicle-bottom side (bottom side of FIG. 25) of the upper notch groove 81 which is on the vehicle-rear side of the closed end section 81A on the vehicle-front side. The convex section 81C protrudes from the edge section 81B on the vehicle-bottom side with a height of H.

The edge section 75B on the vehicle-bottom side of the lower notch groove 72 illustrated in FIG. 22 is such that the length L1 from the closed end section 75A on the vehicle-front side to the open end section on the vehicle-rear side is longer than the length L2 of the edge section 81B on the vehicle-bottom side of the upper notch groove 81 illustrated in FIG. 25 from the closed end section 81A on the vehicle-front side to the open end section on the vehicle-rear side.

A nut 82 is screwed onto the male screw 78B on the right end of the shaft section 78A of the upper installation bolt 78, so that the side plates 79A are held between the head section 78C on the left end of the shaft section 78A and a washer 83, and the inside surfaces of the side plates 79A firmly press against the outside surface of the sleeve 80. By firmly fastening the metal sleeve 80 to the upper vehicle installation plate 79 in this way, it is possible for the upper support bracket 59*a* to be supported by and fastened to the vehicle body. The outside surface of the metal sleeve 80 is used for fastening, so the durability of the lower support bracket 59*a* made of resin is improved.

Figure 20:
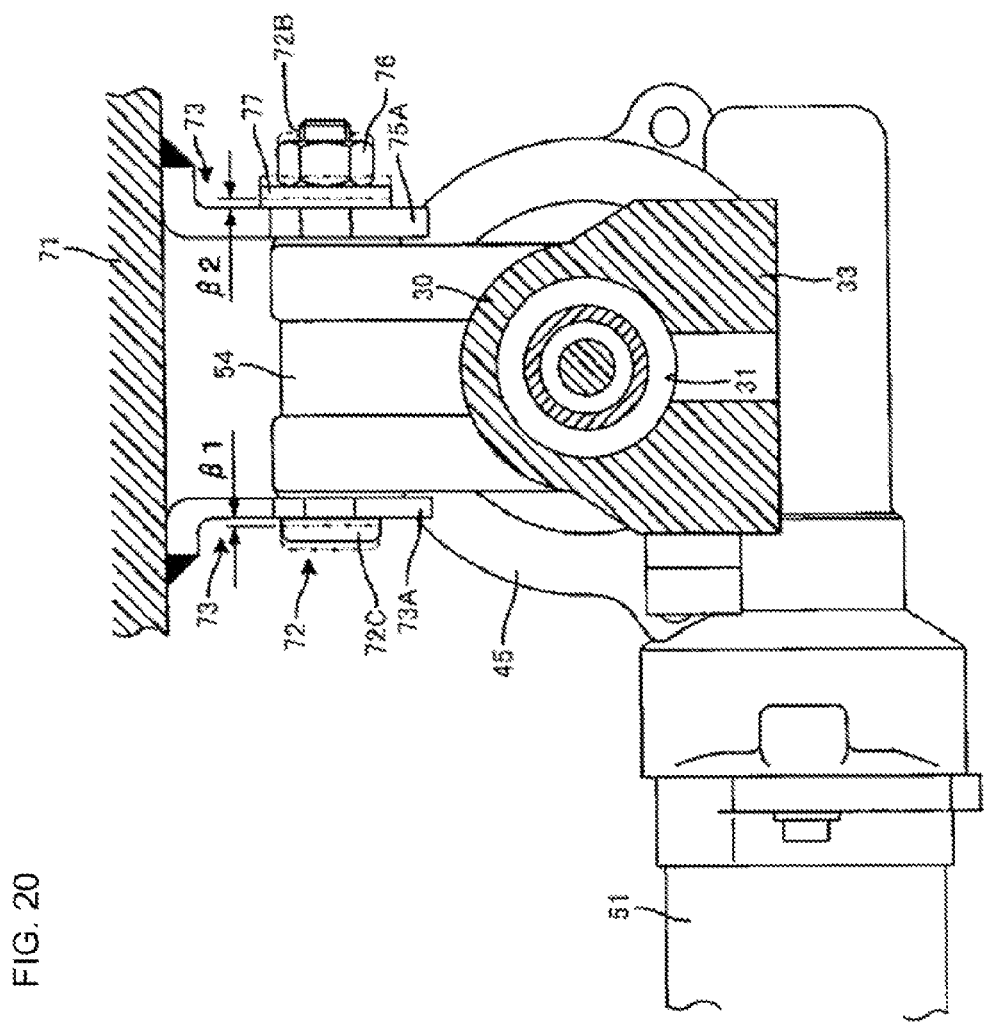
FIG. 20 is a cross-sectional view of section I-I in FIG. 19.
Figure 23:
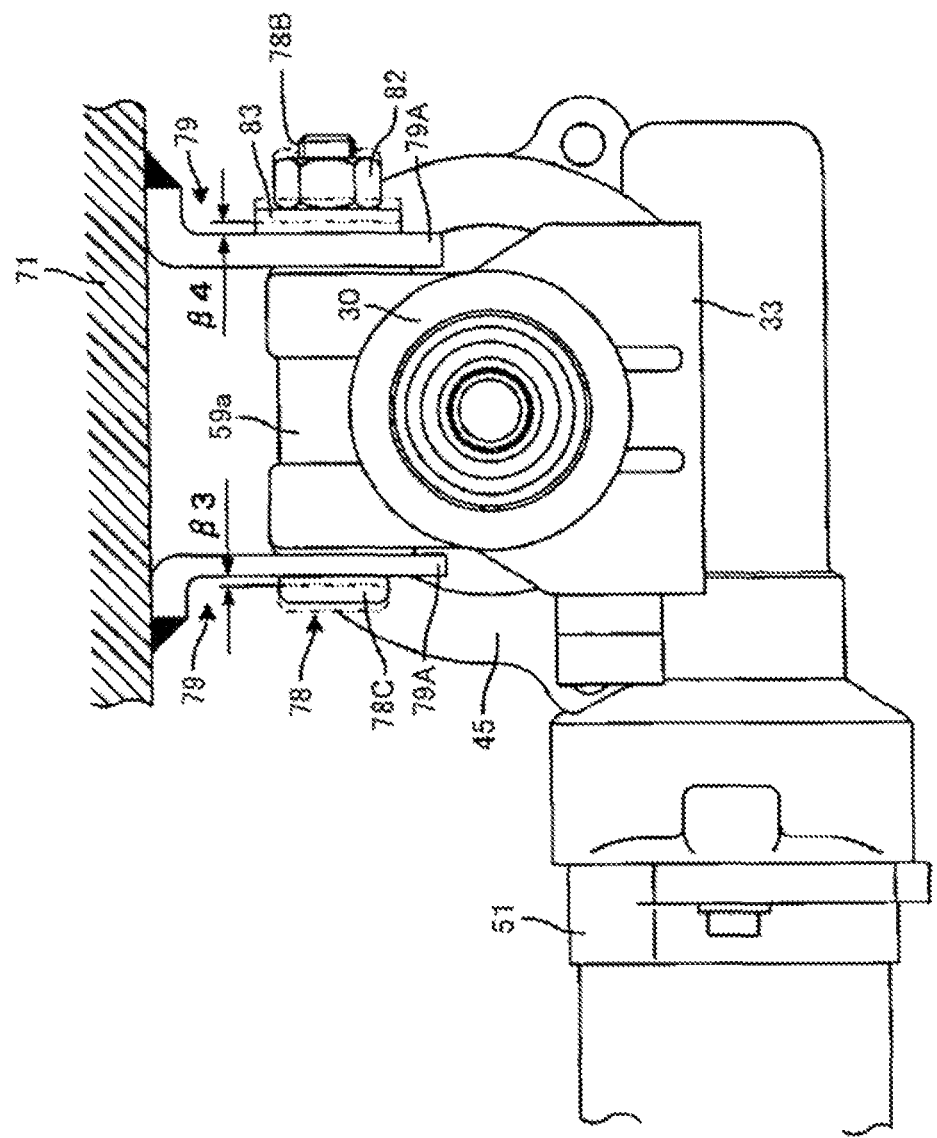
FIG. 23 is a view as seen from the direction of arrow P in FIG. 19.

The procedure for attaching the column unit for an electric power steering apparatus of the present invention to the vehicle body 71 is explained below. In other words, first, the nut 76 on the lower support bracket 54 side and the nut on the upper support bracket 59*a* side are loosened so that there are spaces β1, β2, β3 and β4 between the head section 72C and the side plate 73A, between the washer 77 and the side plate 73A, between the head section 78C and the side plate 79A, and between the washer 83 and the side plate 79A, respectively (FIG. 20 and FIG. 23).

Next, the shaft section 72A of the lower installation bolt 72 on the heavy lower support bracket 54 side is placed on the edge section 75B on the vehicle-bottom side of the lower notch grooves 75. Then, the shaft section 78A of the upper installation bolt 78 on the upper support bracket 59*a* side is inserted into the upper notch grooves 81. As described above, the length L1 of the edge sections 75B on the vehicle-bottom side of the lower notch grooves 72 is longer than the length L2 of the edge sections 81B on the vehicle-bottom side of the upper notch grooves 81. Therefore, when the shaft section 78A of the upper installation bolt 78 is inserted into the upper notch grooves 81, the shaft section 72A of the lower installation bolt 72 is hard to separates from the edge sections 75*b* on the vehicle-bottom side of the lower notch grooves 75, so assembly work become easy.

Moreover, the groove widths in the vertical direction of the vehicle of the lower notch grooves 75 and upper notch grooves 81 are formed so as to gradually become wider going from the vehicle-front side toward the vehicle-rear side, so it is easy to insert the shaft section 72A of the lower installation bolt 72 and the shaft section 78A of the upper installation bolt 78 into the lower notch grooves 75 and upper notch grooves 81 respectively, and thus the time for performing assembly work can be shortened.

As the shaft section 78A of the upper installation bolt 78 is inserted into the upper notch grooves 81, the shaft section 78A goes beyond the convex section 81C and reaches the closed end sections 81A of the upper notch grooves 81. At the same time, the shaft section 72A of the lower installation bolt 72 reaches the closed end sections 75A of the lower notch grooves 75. The convex sections 81C protrude from the edge sections 81B on the vehicle-bottom side with a height H, so that once the shaft section 78A has reached the closed end sections (proper installation position) 81A, it becomes difficult for the shaft section 78A to come out of the upper notch grooves 81.

Finally, the nut 76 on the lower support bracket 54 side is tightened, holding the side plates 73A between the head section 72C and the washer 77 and fastening the lower support bracket 54 to the lower vehicle installation plate 73, then the nut 82 on the upper support bracket 59*a* side is tightened, holding the side plates 79A between the head section 78C and the washer 83 and fastening the upper support bracket 59*a* to the upper vehicle installation plate 79.

When the driver collides with the steering wheel 1 during a secondary collision, an impact force F acts on the inner column 38 and outer column 30 in a direction toward the vehicle-top side (FIG. 19 and FIG. 24). The impact force F toward the vehicle-top side is supported mainly by steel upper installation bolt 78 and the upper vehicle installation plate 79, so deformation of the outer column 30 and upper support bracket 59*a* made up synthetic resin is small, and thus the inner column 38 can collapse smoothly.

Moreover, the lower support bracket 54 and the upper support bracket 59*a* are integrally formed with the outer column 30, so the installation precision of the lower support bracket 54 and the upper support bracket 59*a* with respect to the outer column 30. Therefore, when the outer column 30 is fastened to the vehicle body by way of the lower support bracket 54 and upper support bracket 59*a*, bending and twisting occurring in the outer column 30 becomes small, so the inner column 38 can collapse smoothly. In this example, the other construction and functions are the same as in the first example or section example of the first embodiment.

Figure 26:
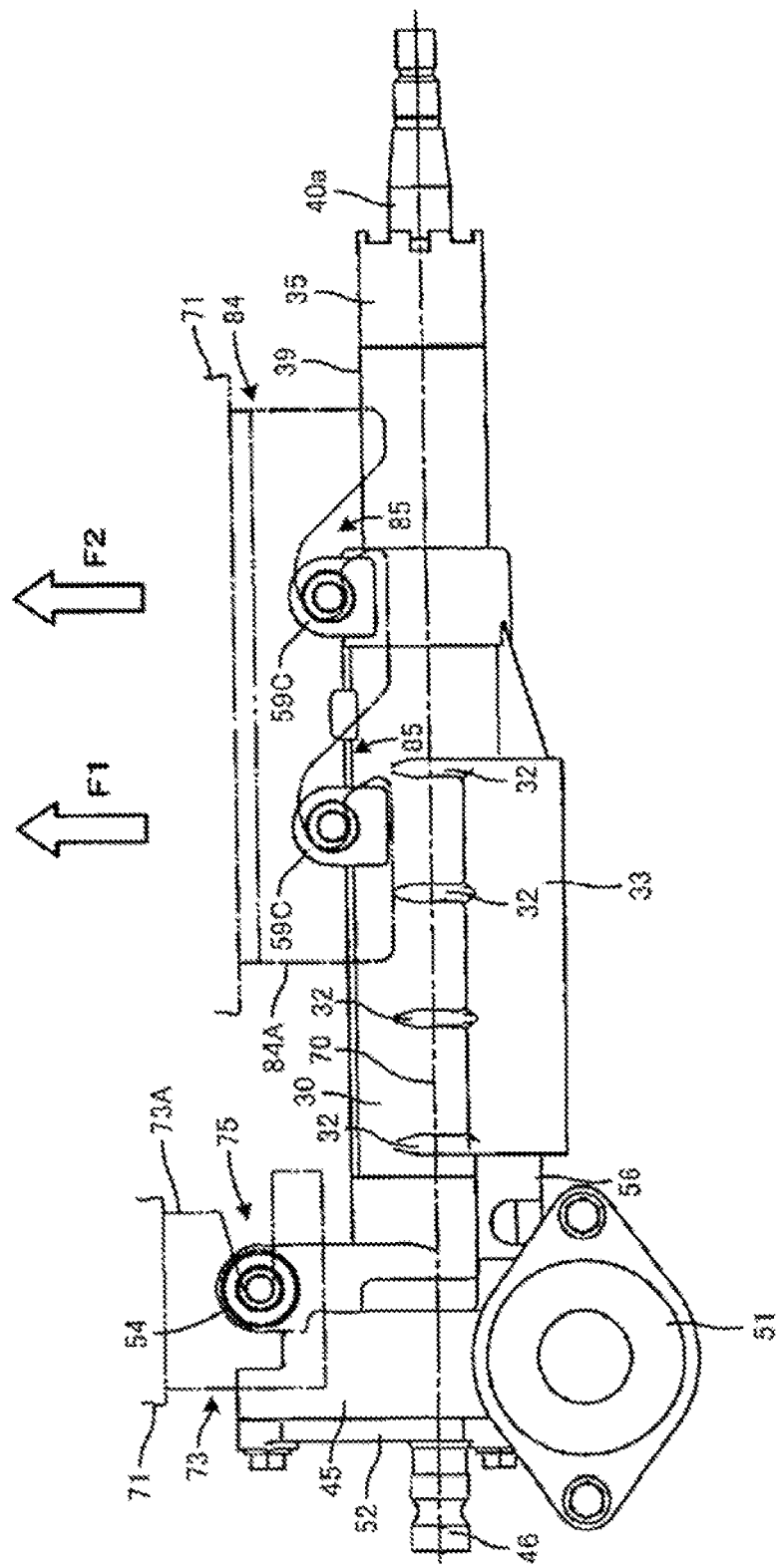
FIG. 26 illustrates a second example of the second embodiment of a column unit for an electric power steering unit of the present invention, and is a front view as seen from the side of the vehicle body.
Figure 27:
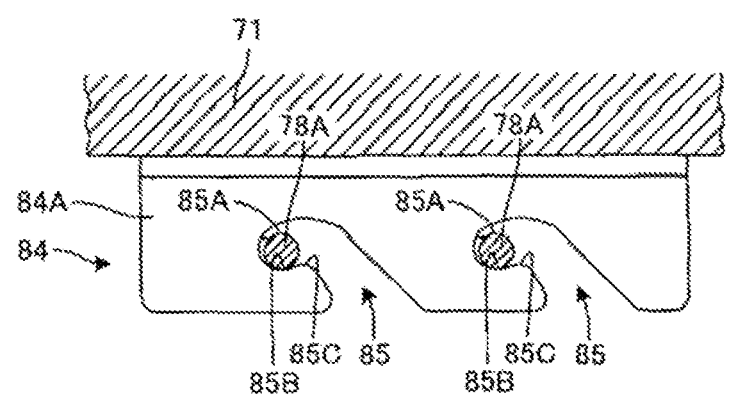
FIG. 27 is a front view of the upper vehicle body installation plate in FIG. 26, as seen from the side of the vehicle body.

FIG. 26 and FIG. 27 illustrate a second example of the second embodiment of the present invention. In the column unit for an electric power steering apparatus of this example, by providing two upper support brackets 59c, deformation in the outer column 30 and upper support bracket 59c made of synthetic resin is further reduced.

Two upper support brackets 59c are integrally formed with the outer column 30 made of synthetic resin and are separated in the front/rear direction of the vehicle on the vehicle-rear side of the outer column 30 and protrude upward from the outer column 30 toward the vehicle-top side (upward in FIG. 26). Both of the upper support brackets 59c have the same construction as the upper support bracket 59a of the first example of the first embodiment and the first example of the second embodiment, and each is fastened to an upper vehicle installation plate 84 by a steel upper installation bolt 78 that is inserted through an upper installation hole 60 that is formed in the upper support bracket 59c.

The upper vehicle installation plate 84 is made of metal such as steel, and the top end thereof is fastened to the vehicle body 71, and a pair of side plates 84A of the upper vehicle installation plate 84 that extend downward from the vehicle 71 hold both sides in the vehicle-width direction of the upper support brackets 59c. Two sets of upper notch grooves 85 having the same construction as the upper notch grooves 81 in the first example of the second embodiment are formed in the side plates 84A of the upper vehicle installation plate 84, and the shaft sections 78A of the upper installation bolts 78 are inserted into the upper notch grooves 85. The space between these upper notch grooves 85 is the same as the space between the two upper support brackets 59c.

The upper notch grooves 85 also are formed such that the vehicle-front side is closed and the vehicle-rear side is open. Moreover, the upper notch grooves 85 are formed so that the groove width in the vertical direction of the vehicle gradually widens going from the vehicle-front side toward the vehicle-rear side. Convex sections 85C that protrude toward the vehicle-top side are formed on the edge sections 85B of the vehicle-bottom side (downward side of FIG. 26 and FIG. 27) of the upper notch grooves 85 on the vehicle-rear side of the closed end sections 85A on vehicle-front side. The procedure for attaching the column unit of this example to the vehicle body 71 is the same as in the first example of the second embodiment.

When the driver collides with the steering wheel 1 during a secondary collision, an impact force acts on the inner column 38, outer column 30 in the upward direction toward the vehicle-top side. The impact force in the direction toward the vehicle-top side is dispersed and acts on the shaft sections 78A of the steel upper installation bolts 78 of the two upper support brackets 59c as impact forces F1 and F2. Therefore, deformation that occurs in the outer column 30 and two upper support brackets 59c made of synthetic resin becomes less than in the first example of the second embodiment, so the inner column 38 can collapse smoothly. The other construction and functions are the same as in the first example of the second embodiment.

Figure 28:
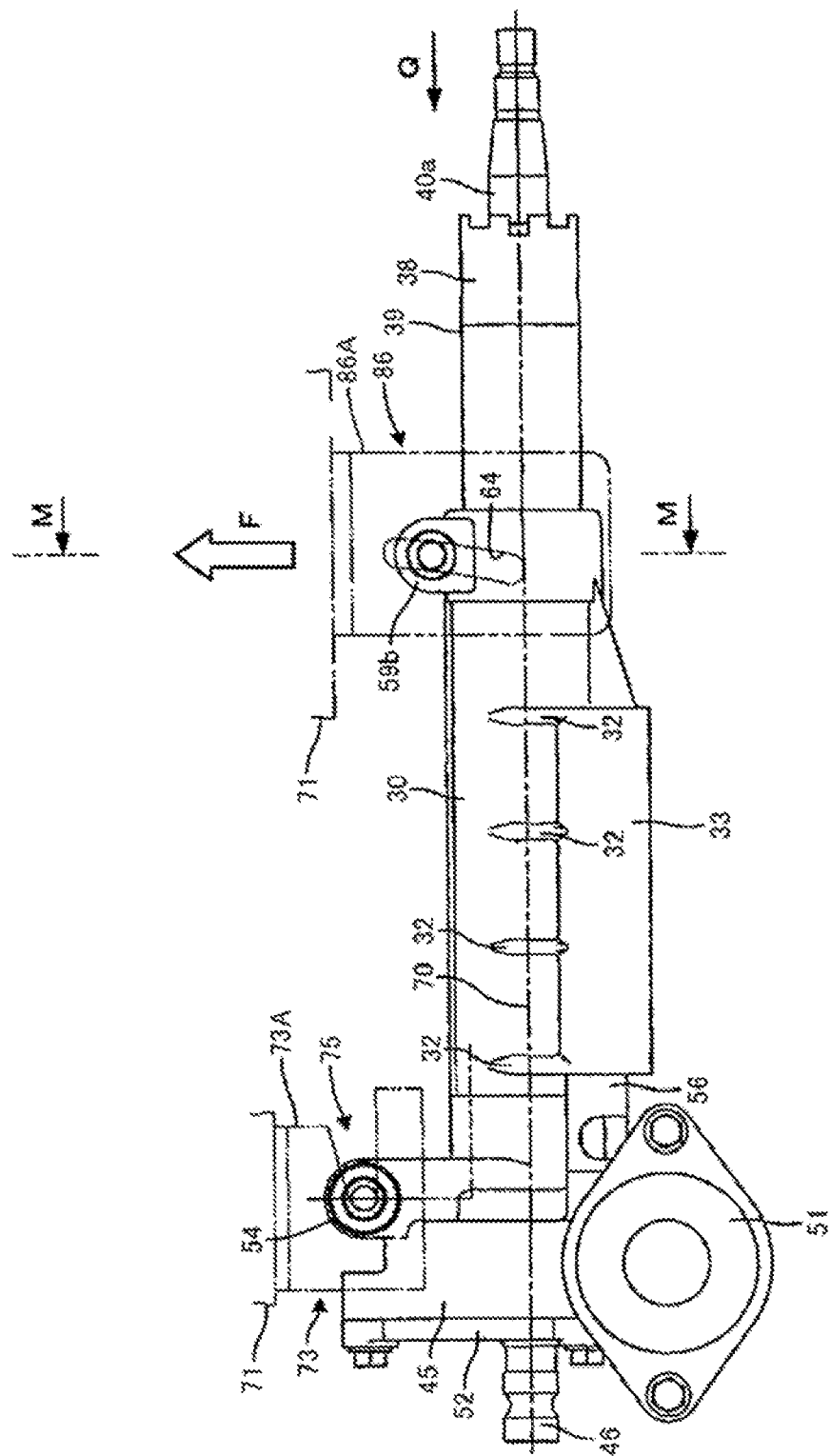
FIG. 28 illustrates a third example of the second embodiment of a column unit for an electric power steering unit of the present invention, and is a front view as seen from the side of the vehicle body.
Figure 29:
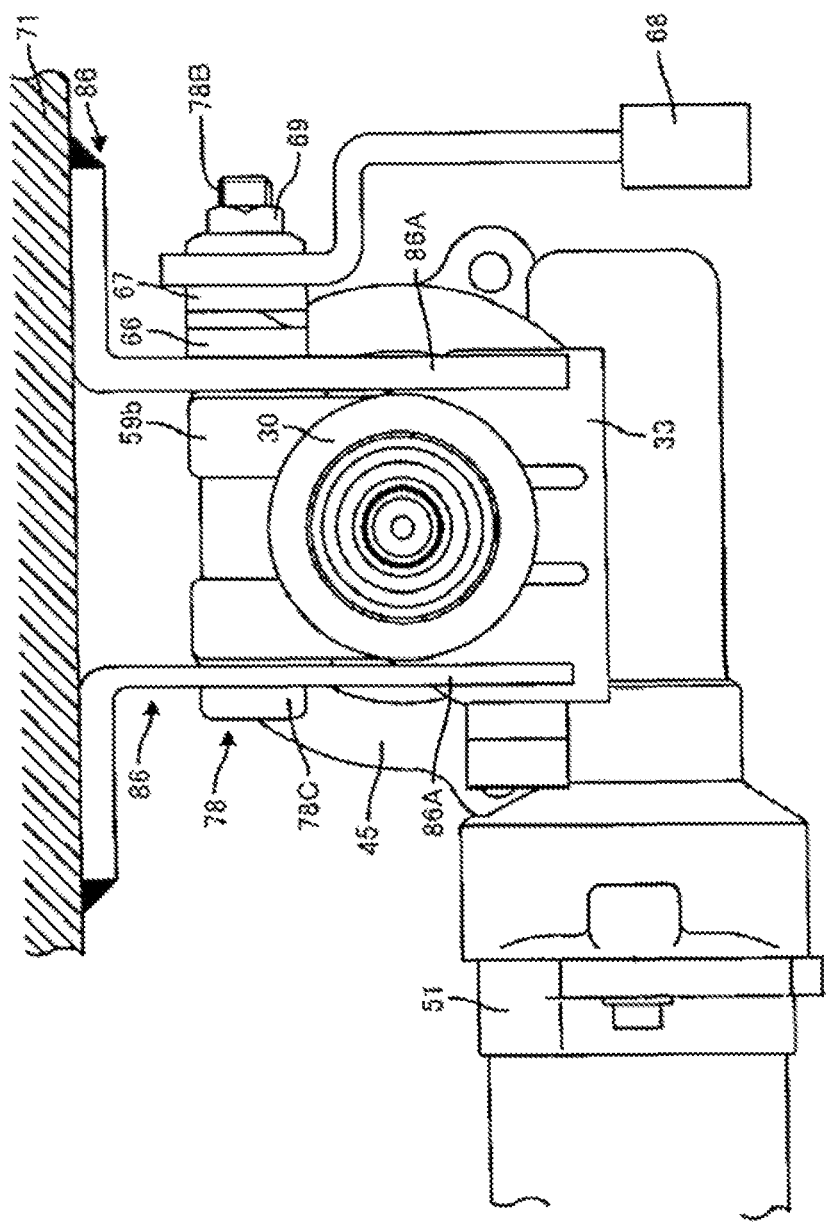
FIG. 29 is a view as seen from the direction of arrow Q in FIG. 28.
Figure 30:
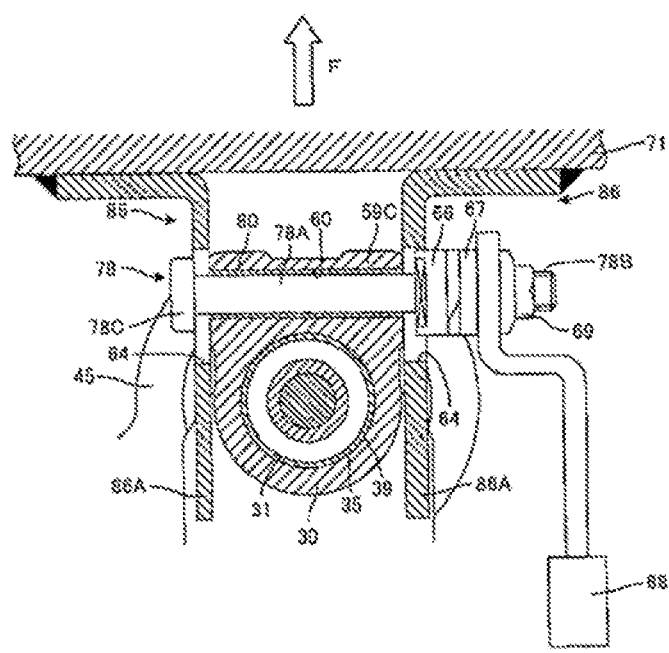
FIG. 30 is a cross-sectional view of section M-M in FIG. 28.

FIG. 28 to FIG. 30 illustrate a third example of the second embodiment of the present invention. The column unit for an electric power steering apparatus of this example is applied to an electric power steering apparatus that comprises a tilt mechanism, but does not comprise a telescopic mechanism.

Therefore, as in the second example of the first embodiment, long tilt adjustment grooves 64 are formed in a pair of side plates 86A of the upper vehicle installation plate 86 of this example. The long tilt adjustment grooves 64 are formed into a circular arc shape centered around the lower installation bolt 72 that is inserted through the lower support bracket 54. The shaft section 78A of the upper installation bolt 78 is inserted through the long tilt adjustment grooves 64 and upper installation hole 60 from the left side in FIG. 29 and FIG. 30.

A head section 78C is formed on the left end of the upper installation bolt 78. A stationary cam 66, movable cam 67, operation lever 68 and nut 69 are fitted in this order around the outer surface of the right end of the shaft section 78A, and the female screw (not illustrated in the figures) that is formed in the inner-diameter section of the nut 69 is screwed onto the male screw 78B that is formed on the right end of the shaft section 78A. The other construction and function of the tilt mechanism is the same as in the second example of the first embodiment.

When the driver collides with the steering wheel 1 during a secondary collision, an impact force F (FIG. 28 and FIG. 30) acts on the inner column 38 and outer column 30 in the upward direction toward the vehicle-top side. The impact force F toward the vehicle-top side is supported mainly by the steel upper installation bolt 78 and upper vehicle installation plate 86, so deformation occurring in the upper support bracket 59a becomes small, so the inner column 38 can collapse smoothly. The other construction and function are the same as in the first example of the second embodiment.

Figure 31:
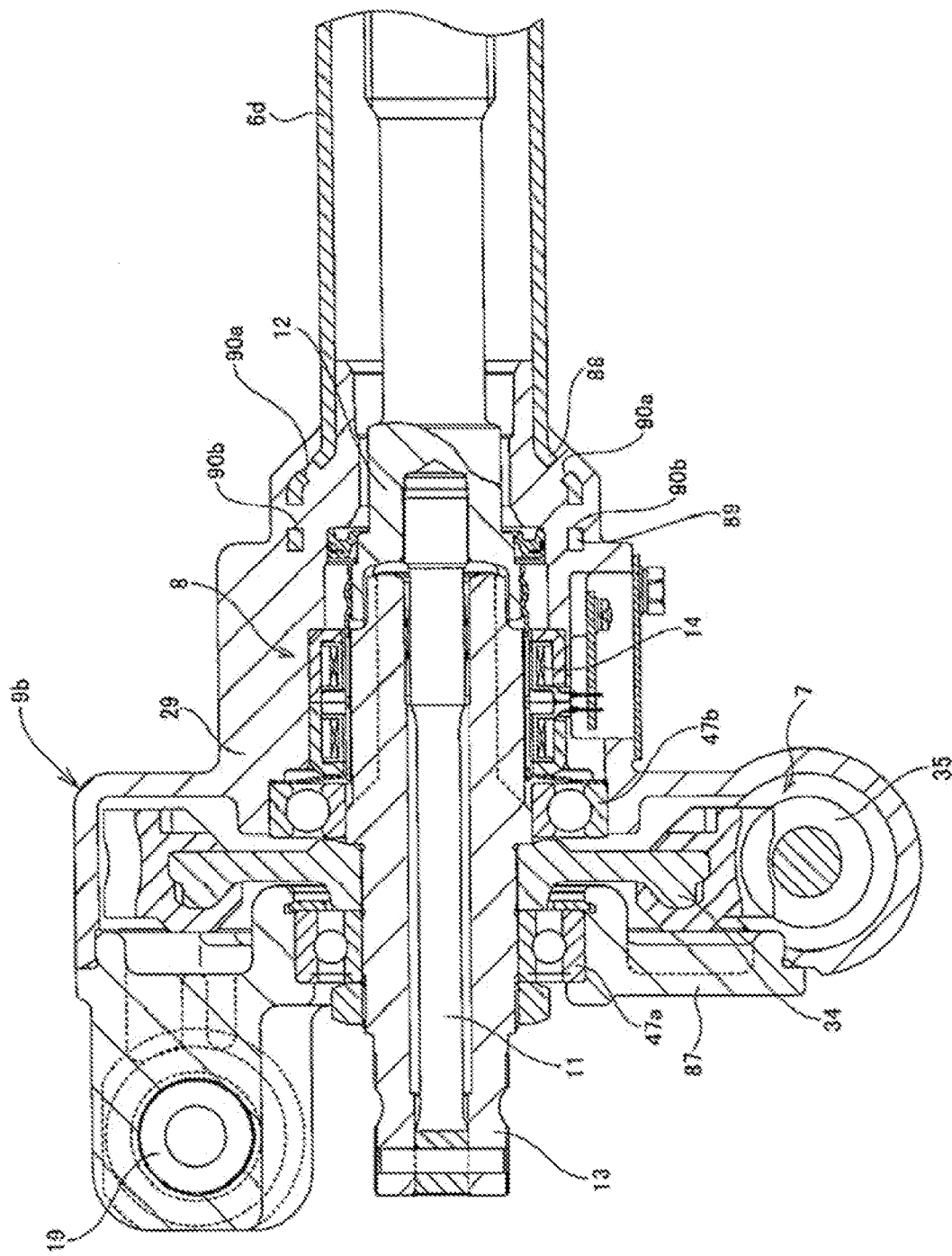
FIG. 31 is a cross-sectional view of the major parts of a first example of a third embodiment of the present invention.
Figure 32:
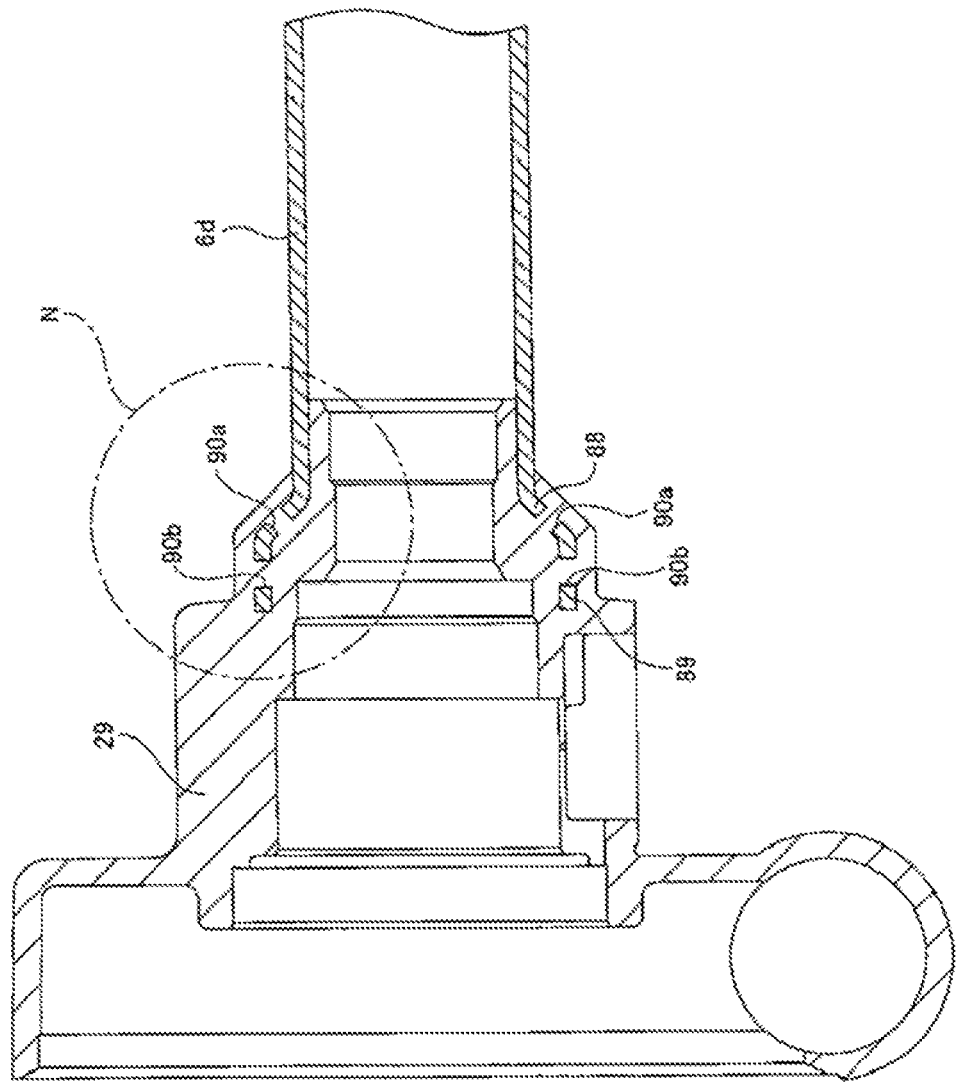
FIG. 32 is a cross-sectional view of the main section of the housing, and the steering column which are taken from FIG. 31.
Figure 33:
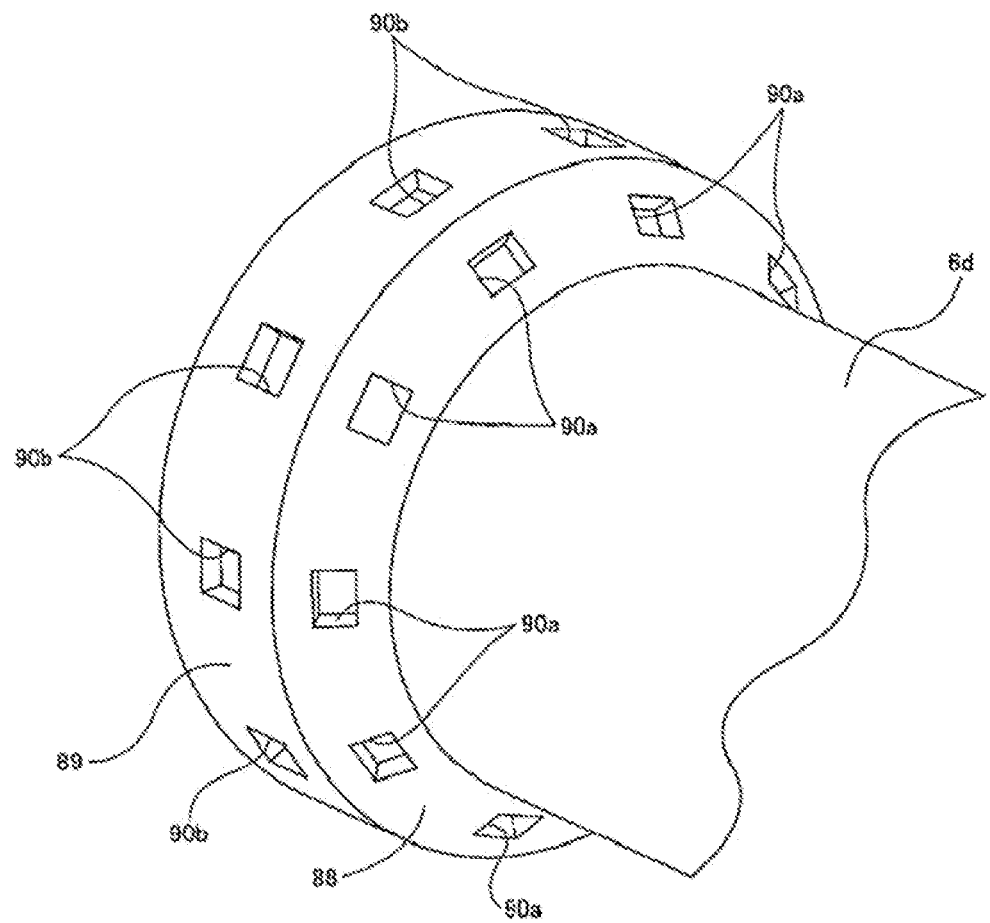
FIG. 33 is a perspective view that illustrates the front end section of the steering column of the first example of the third embodiment in the state before combining it with the main section of the housing.

FIG. 31 to FIG. 33 illustrate a first example of a third embodiment of the present invention. Including this example, the feature of this third embodiment of the present invention is the construction of the joined section between the front end section of the steering column and the rear end section of the housing for the an electric power steering apparatus. The other construction and function are the same as in a conventional column unit for an electric power steering apparatus.

In the column unit for an electric power steering apparatus of this example, the front end section of the metal steering column 62 and the rear end section of the main section 29 of a housing 9b made of synthetic resin are integrally joined and fastened together when performing injection molding of this main section 29 using synthetic resin. The third embodiment of the present invention is not limited to constructing the housing synthetic resin, and construction is also possible wherein the housing is made of aluminum alloy.

The housing 9b is formed into a hollow shape by joining and fastening together by welding, screws or the like, the main section 29 and a cover section 87 that are both formed by injection molding of the same kind of synthetic resin. The front end section of the input shaft 12 (left end section in FIG. 31), from the rear end section to the middle section of the output shaft 13 (right end section in FIG. 31), a torsion bar 11, a torque measurement apparatus 8 and the like are housed in the housing 9b. Moreover, two locations in the middle section of the output shaft 13 that are separated in the axial direction are supported inside the housing 9b by a pair of rolling bearings 47a, 47b so as to be able to rotate freely. A worm wheel 49 fits around and is fastened to the output shaft 13 in the portion between these rolling bearings 47a, 47b by a serration fit or the like. This worm wheel 49 and a worm 50 that is rotated and driven by an electric motor 10 (FIG. 45) engage and apply an assist torque to the output shaft 13.

On the other hand, the entire steering column 6d is formed into a cylindrical shape using a metal cylinder (drawn pipe or seam welded pipe) made of a ferrous alloy, such as carbon steel, or an aluminum alloy, with the front end section being expanded into a trumpet shape. In other words, a bent section 88, a large-diameter cylindrical section 89 and a plurality of through holes 90a, 90b where material has been removed are formed on the front end section of the steering column 6d. Of these, the bend section 88 is a partial conical cylindrical shape that is inclined in a direction such that the diameter becomes larger going from toward the front. The large-diameter section 89 is cylindrical shaped and is concentric with the main portion of the steering column 6d (portion further toward the rear than the bent section 88). Furthermore, the through holes 90a, 90b are formed such that there is a plurality of holes in both the bent section 88 and the large-diameter cylindrical 89. In the example in the figure, the same number of through holes 90a, 90b are formed in both the bent section 88 and the large-diameter cylindrical section 89, and the phase of the holes in the circumferential direction is the same. However, the number of these through holes 90a, 90b can be freely set according to the required strength, and it is not absolutely necessary that the phase between the holes in the bent section 88 and the large-diameter cylindrical section 89 be the same. However, preferably, the holes are provided in three or more locations in each, for a total of six or more locations.

The steering column 6d, having a bent section 88, a large-diameter cylindrical section 89 and a plurality of through holes 90a, 90b formed on the front end section, and the main section 29 of the housing 9b are joined and fastened together when performing injection molding of the housing 9b using thermoplastic synthetic resin. In other words, with the front end section of the steering column located at a specified location inside the cavity of the die for performing injection molding of the main section 29, synthetic resin in a heated and melted state is fed into the cavity. The melted resin that is fed into the cavity is cooled and hardened to form the main section 29. When doing this, part of the melted resin enters into the through holes 90a, 90b and solidifies inside these through holes 90a, 90b. As a result, of the synthetic resin that forms the main section 29, the portion that exists further on the outer diameter side than the front end section of the steering column 6d and the portion that exists on the inner diameter side are integrally joined together. At the same time, the main section 29 and the steering column 6d are firmly joined together. As long as the synthetic resin can maintain the required strength, rigidity and durability, any type can be used. For example, preferably polyamide resin (PA) or polyethylene-telephthalate (PET), in which reinforcement material such as glass fibers or carbon fibers are mixed, is used.

In the column unit for an electric power steering apparatus of this example, the front end section of the steering column 6d made of a ferrous alloy and in which a plurality of through holes 90a, 90b are formed is embedded in and fastened to the rear end section of the main section 29 of the housing 9b made of synthetic resin, so it is possible to sufficiently increase the strength and rigidity of the joined section between the steering column 6d and main section 29. Therefore, even when used over a long period of time as temperature changes, there is no problem with backlash in the joined section between the steering column 6d and housing 9b.

Figure 34:
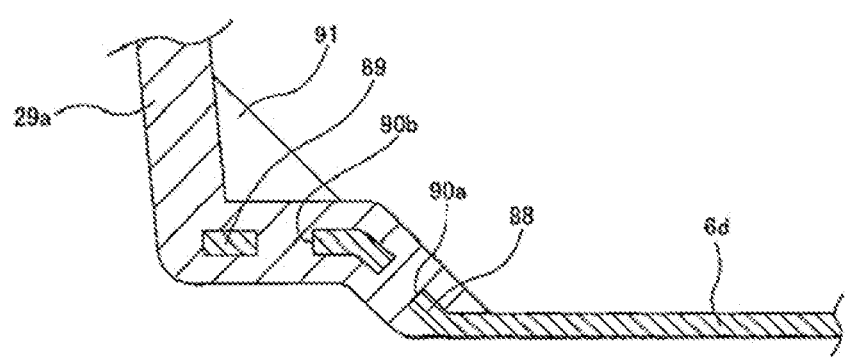
FIG. 34 illustrates a second example of the third embodiment of the present invention, and corresponds to area N in FIG. 32.

FIG. 34 illustrates a second example of the third embodiment of the present invention. In the example, the thickness of the rear end section of the main section 29a of the housing is thinner than in the first example of this third embodiment. Instead, reinforcing ribs 91 are formed at a plurality of locations in the circumferential direction around the outer surface of the main section 29a. The construction and functions of other parts are the same as in the first example of the third embodiment.

Figure 35:
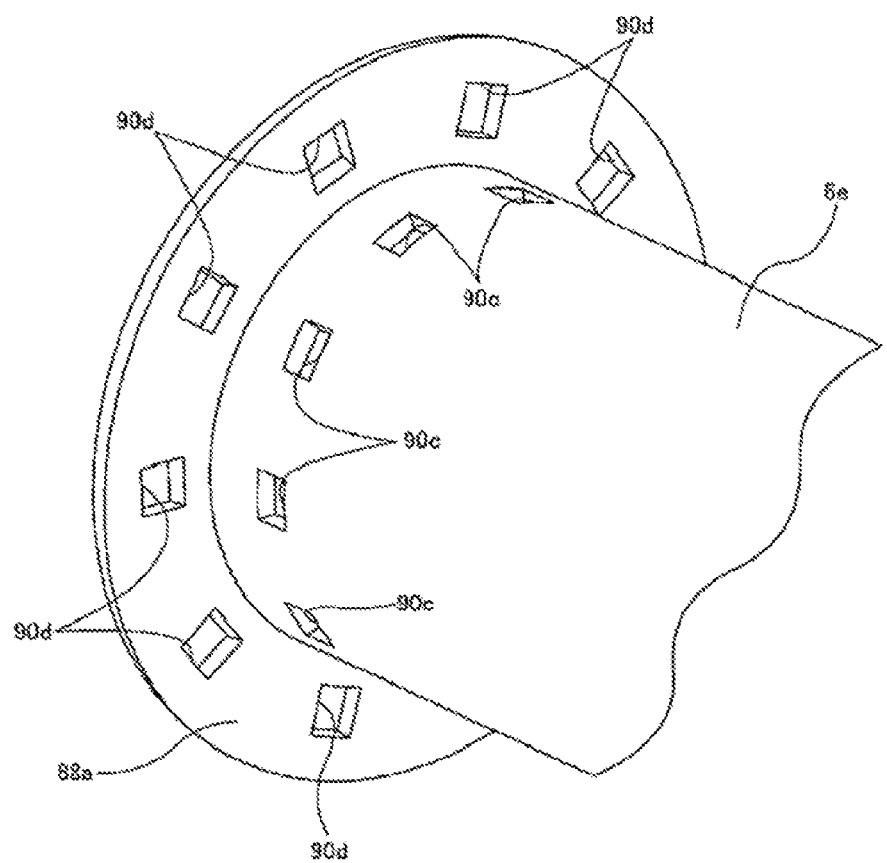
FIG. 35 illustrates a third example of the third embodiment of the present invention, and is the same as FIG. 33.
Figure 36:
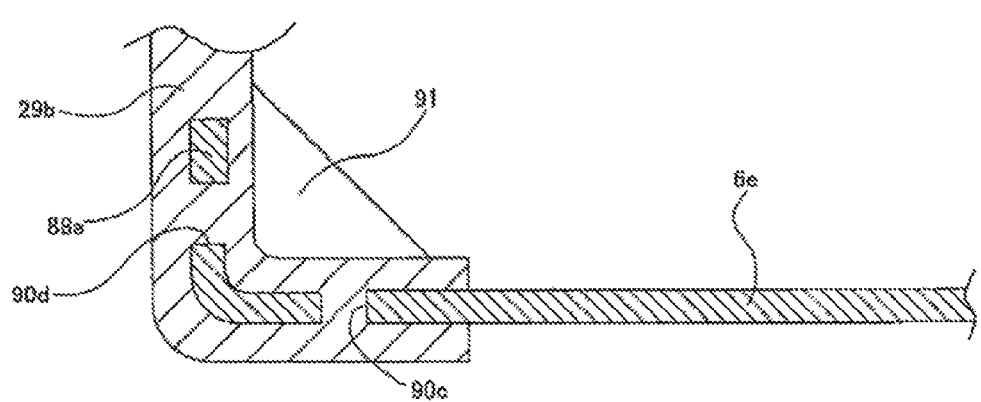
FIG. 36 illustrates a third example of the third embodiment of the present invention, and is the same as FIG. 34.

FIG. 35 and FIG. 36 illustrate a third example of the third embodiment of the present invention. In the case of this example, an outward facing flange shaped bent section 88a is formed by bending the edge section on the front end of the steering column 6e outward in the radial direction at a right angle. A plurality of through holes 90c, 90d are formed in this bent section 88a and in front end section of the steering column in the portion further toward the rear than this bent section 88a. When performing injection molding of the main section 29 of the housing, the front end section of the steering column 6e, including the bent section 88a, is embedded in the rear end section of the main section 29, and the steering column 6e and the main section 29b are joined and fastened together. The construction and functions of the other parts are the same as in the second example of the third embodiment.

Figure 37A:
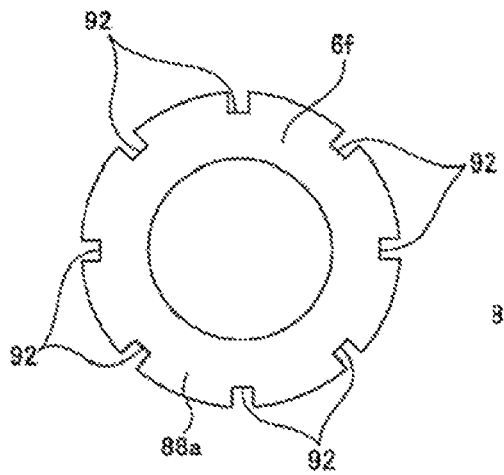
FIGS. 37A and 37B illustrate a fourth example of the third embodiment of the present invention, where
Figure 37B:
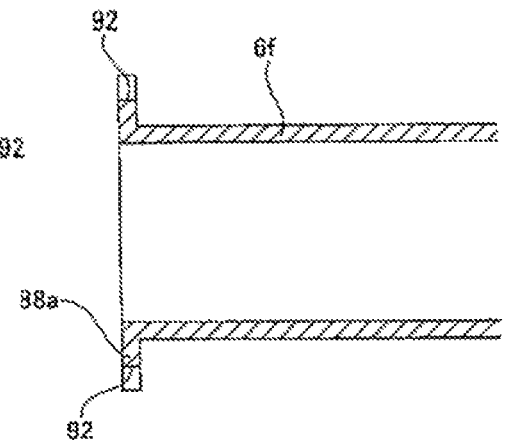
Figure 38A:
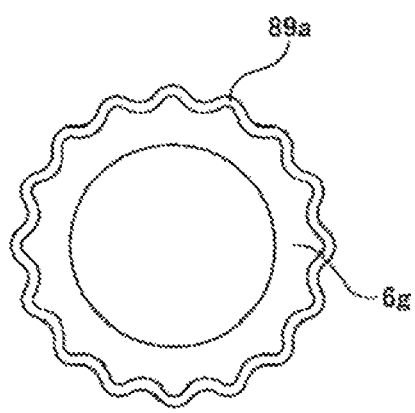
FIGS. 38A and 38B illustrates a first example of a reference example related to the present invention, where
Figure 38B:
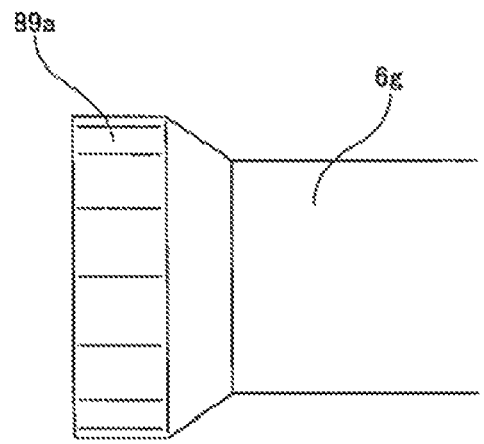
Figure 39A:
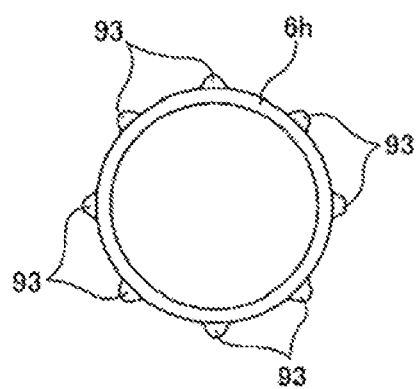
FIGS. 39A and 39B illustrate a second example of the reference example related to the present invention, and are the same as FIGS. 38A and 38B.
Figure 39B:
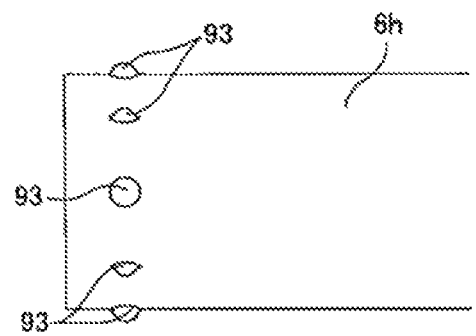
Figure 40:
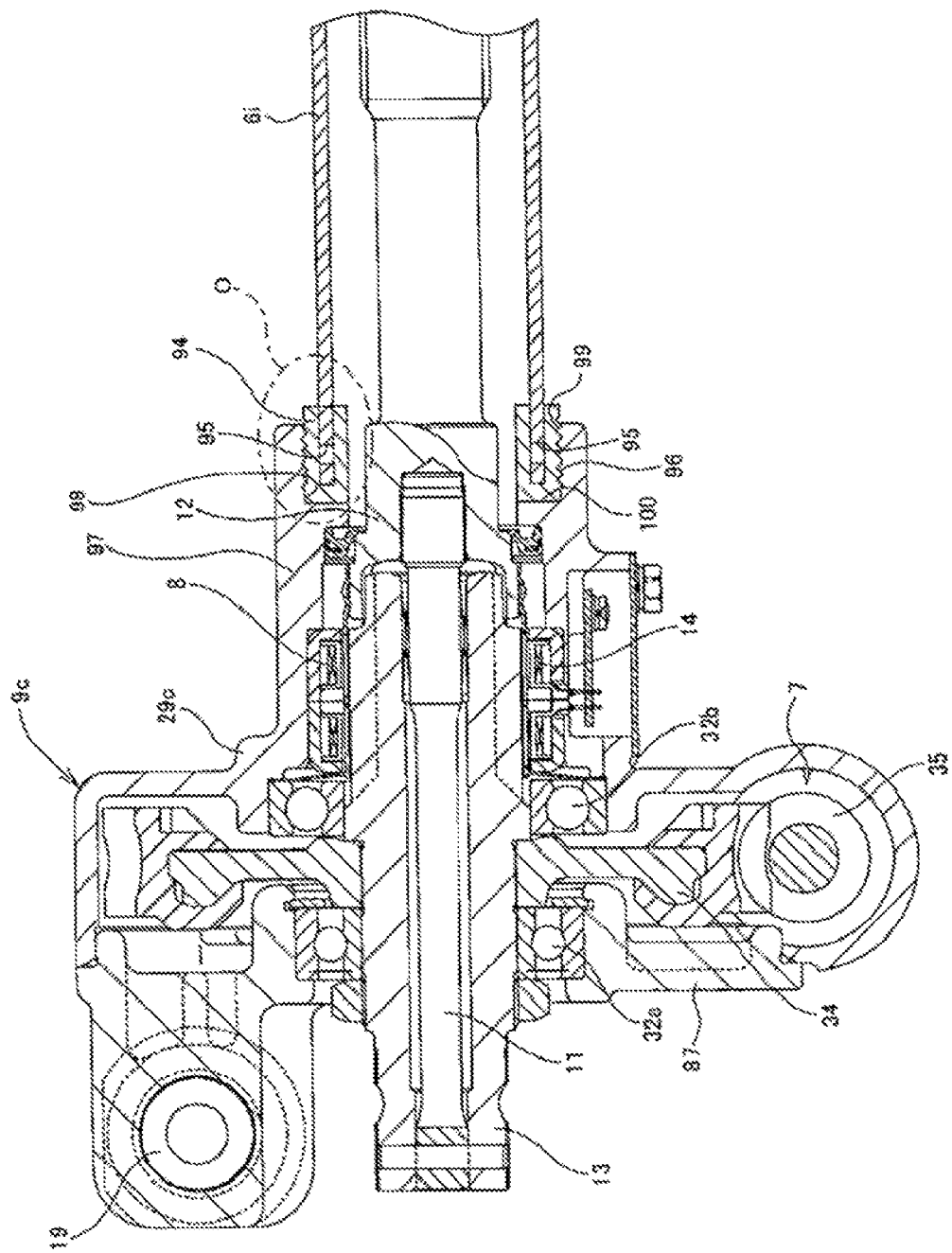
FIG. 40 is a cross-sectional view that illustrates a first example of a fourth embodiment of the present invention.
Figure 41:
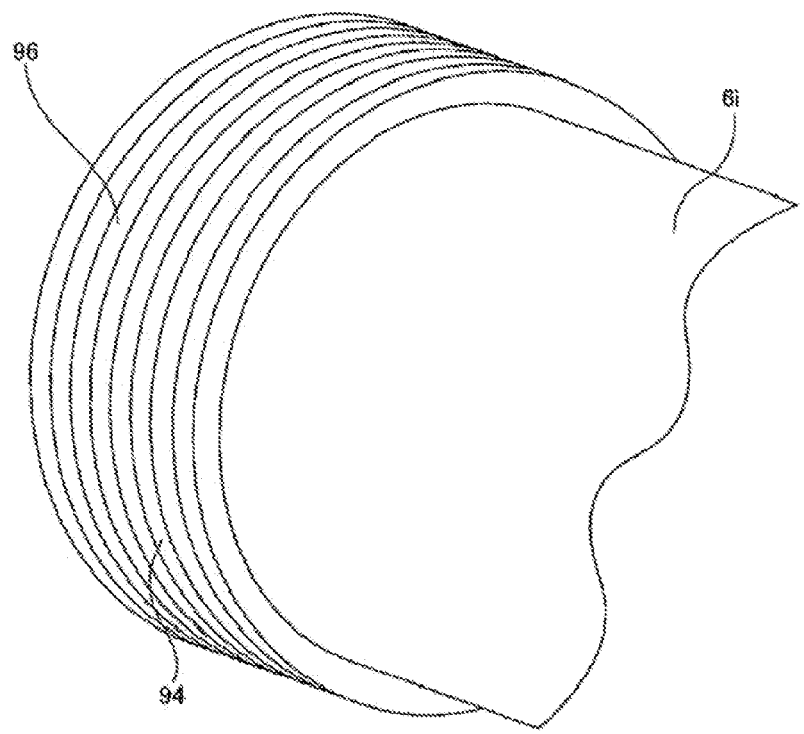
FIG. 41 is a perspective view of the first example of the fourth embodiment, and illustrates the front end section of the steering column where screw rings are formed.
Figure 42:
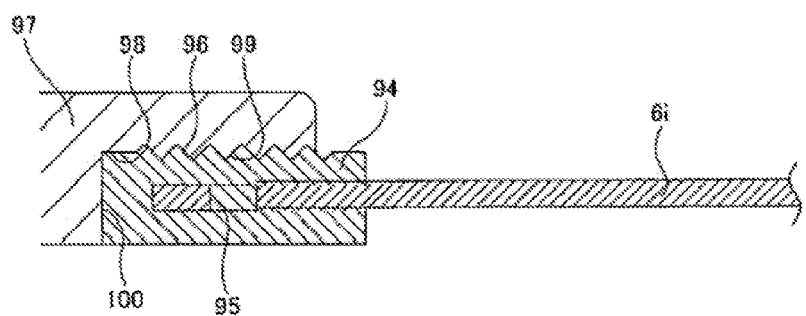
FIG. 42 is an enlarged view of area O in FIG. 40.
Figure 43:
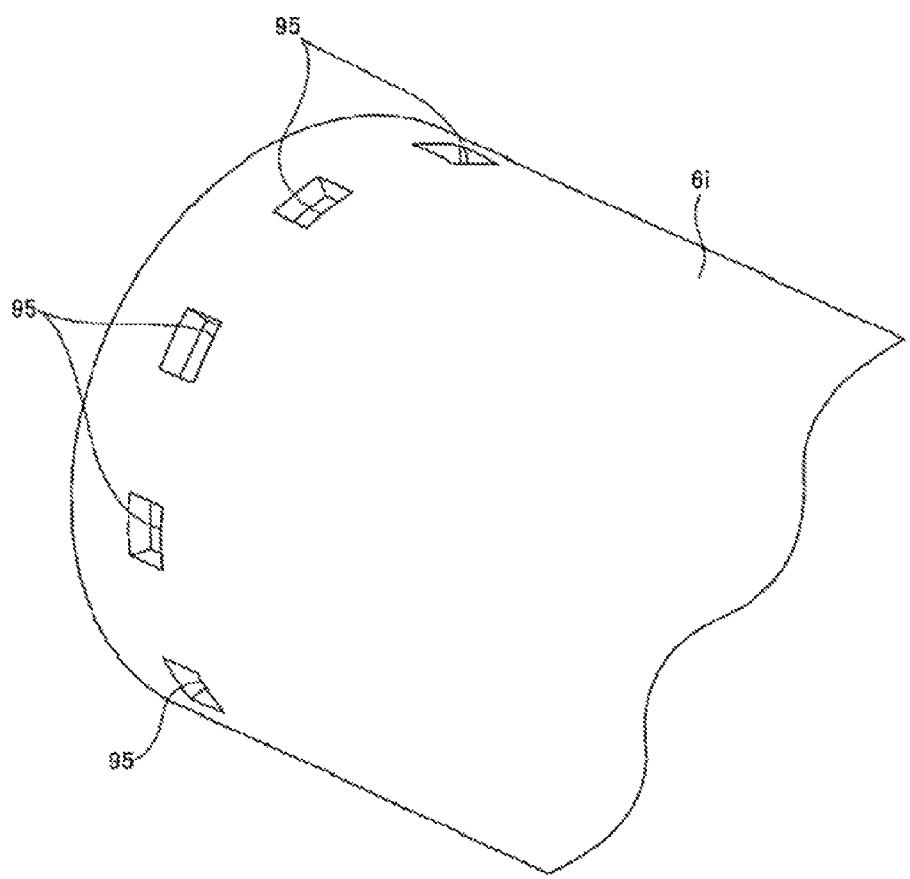
FIG. 43 is a perspective view of the first example of the fourth embodiment of the invention, and illustrates the front end section of the steering column before forming screw rings.

FIGS. 37A and 37B illustrate a fourth example of the third embodiment of the present invention. In the case of this example as well, an outward facing flange shaped bent section 88a is formed by bending the edge section on the front end of the steering column 6f outward in the radial direction at a right angle. Particularly in this example, a plurality of notches 92 are formed on the outer perimeter edge section of the bent section 88a. When performing injection molding of the housing, part of the synthetic resin that forms the housing enters into these notches 92, joining and fastening together the housing and the steering column 6f. The construction and function of the other parts is the same as in the third example of the third embodiment.

In construction where the front end section of the steering column is embedded in and supported by the rear end section of the housing, construction such as illustrated in FIGS. 38A and 38B and FIGS. 39A and 39B are also feasible as construction for improving the bonding strength between the steering column and the housing. Of these, in the construction illustrated in FIGS. 38A and 38B, the shape of the large-diameter cylindrical section 89a that is formed on the front end section of the steering column 6g is a wave shape in the circumferential direction. Moreover, in the construction illustrated in FIGS. 39A and 39B, a bent section is not formed on the front end section of the steering column 6h, however, embossed shaped protrusions 93 are formed on the front end section of the steering column 6g. In either construction, it is possible to improve the bonding strength between the steering column and the housing, however, the apparent thickness of the portion on the front end section of the steering column that is embedded in the rear end section of the housings (½ the difference between the circumscribed circle and the inscribed circle of the cross-sectional shape) increases. As a result, the thickness dimension of the rear end section of the housing partially decreases (in the portion corresponding to the peaks of the waves or peaks of the protrusions 93), so there is a possibility that it would be difficult to both reduce the size and lighten the weight and to maintain the durability of this portion. However, in the case of the present invention, both are easily achieved.

FIG. 40 to FIG. 43 illustrate a first example of a fourth embodiment of the present invention. The feature of this fourth embodiment of the present invention, including this example, is the construction of the joined section between the front end section of the steering column and the rear end section of the housing for an electric power steering apparatus. The construction and function of other parts are the same as in a conventional column unit for an electric power steering apparatus.

In the column unit for an electric power steering apparatus of this example, the front end section of the steering column 6i and the rear end section of the main section 29c of the housing 9c are joined and fastened together by way of a screw ring 94 that is joined and fastened to the front end section of the steering column 61. Similar to the housing 9b in the third embodiment, the housing 9c is formed into a hollow shape by joining and fastening together by welding, screws or the like, the main section 29c and a cover section 87 that are both formed by injection molding of the same kind of synthetic resin.

On the other hand, the steering column 6i is a metal cylinder made of a ferrous alloy such as carbon steel or an aluminum alloy (drawn pipe or seam welded pipe), with a plurality of through holes 95 formed in the front end section. This steering column 6a and the screw ring 94 are integrally joined and fastened together when performing injection molding of the screw ring 94 using synthetic resin. In other words, with the front end section of the steering column 6i placed in a specified location inside the cavity of the die for performing injection molding of the screw ring 94, synthetic resin is fed into the cavity in a heated and molten state. The molten resin that is fed into the cavity embeds the front end section of the steering column 61, and is cooled and solidified to in the cavity to form the screw ring 94. When doing this, part of the molten resin enters inside the through holes 95, and solidifies inside these through holes 95. As a result, of the synthetic resin of the screw ring 94, the portion that exists further on the outer diameter side than the front end section of the steering column 6i and the portion that exists on the inner diameter side are integrally joined. At the same time, the threads of a male screw 96 are formed around the outer circumferential surface of the screw ring 94. The tip end surface of the screw ring 94 is a flat surface that is orthogonal to the center axis.

In order to join and fasten the front end section of the steering column 6i, to which the screw ring 94 is joined and fastened, to the housing 9c, a stepped large-diameter section 98, whose inner diameter is larger than the portion near the front, is formed around the inner circumferential surface of the opening in the rear end of the cylindrical section 97 that is provided on the rear end section of the main section 29c of the housing 9c. A female screw 99, which corresponds to another screw thread, is formed on the inner circumferential surface of this stepped large-diameter section 98. Moreover, the back end section of the stepped large-diameter section 98 functions as a stepped surface 100 that is orthogonal to the center axis of the cylindrical section 97.

The cylindrical section 97 that is formed on the rear end section of the main section 29c of the housing 9c and the front end section of the steering column 6i are concentrically joined and fastened together by way of the screw ring 94. In order for that, the male screw 96 on the outer circumferential surface of the screw ring 94 and the female screw 99 on the inner circumferential surface of the stepped large-diameter section 98 are screwed together and tightened, which strongly presses the tip end surface of the screw ring 94 against the stepped surface 100. As a result, the screw ring 94 and the main section 29c are firmly joined and fastened together, and the steering column 6i that is joined and fastened to this screw ring 94 and the main section 29c are firmly joined and fastened together. In order to make it easier to tighten the screw 94 with a sufficiently large torque, it is possible to form a locking section where a fastening tool is locked on part of the screw ring 94.

In the column unit for an electric power steering apparatus of this example, the front end section of the steering column 6i made of a ferrous alloy, with a plurality of through holes 95 formed therein, is embedded in and fastened to a screw ring 94 made of synthetic resin, and this screw ring 94 and the main section 29c are screwed together, so the strength and rigidity of the joined section between the steering column 6i and the main section 29c can be sufficiently increased. Therefore, even when used of a long period of time as temperature changes, there is no problem with backlash in the joined section between the steering column 6i and the housing 9c.

Moreover, in the case of this example, it is easy to attach or detach the steering column 6i and housing 9c. In other words, by screwing of unscrewing the male screw 96 and female screw 99 by rotating the steering column 6i and housing 9c relative to each other, the steering column 61 and housing 9c can be attached or detached. Therefore, attachment or detachment can be performed without damaging either part. Consequently, it is possible to reduce the labor and cost when repairing the electric power steering apparatus. The construction and functions of other parts are the same as in the first example of the third embodiment.

Figure 44:
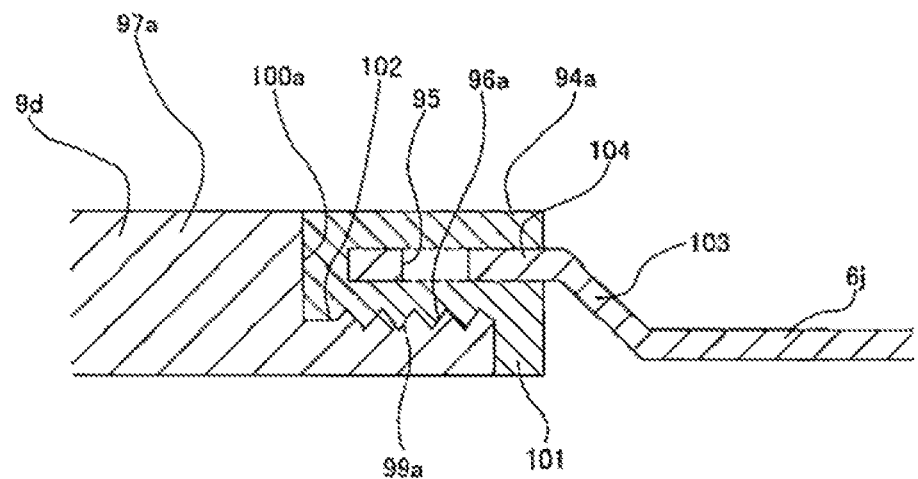
FIG. 44 illustrates a second example of the fourth embodiment of the present invention, and is the same as FIG. 42.

FIG. 44 illustrates a second example of the fourth embodiment of the present invention. In the case of this example, the screw ring 94a is a cap nut. In other words, this screw ring 94a is a cap nut comprising an inward facing flange section 101 that is formed on the rear section of the inner circumferential surface and a female screw 99a that is formed from the middle section to the front end section of the inner circumferential surface. A stepped small-diameter section 102, whose outer diameter is smaller than the portion near the front, is formed around the outer circumferential surface of the rear end section of the cylindrical section 97a that is formed in the housing 9d. A male screw 96a, which corresponds to another screw thread, is formed on the outer circumferential surface of this stepped small-diameter section 102. Moreover, the back end section of the stepped-small diameter section 102 is a stepped surface 100a that is orthogonal to the center axis of the cylindrical section 97a. A large-diameter section 104 is formed on the front end section of the steering column 6j by way of an inclined step section 103, and a plurality of through holes 95 are formed in this large-diameter section 104. When performing injection molding of the screw ring 94a using synthetic resin, the large-diameter section 104 is embedded inside the screw ring 94a. Except for the positions in the radial direction of the screw ring 94a and the cylindrical section 97a being reversed, the construction and function are the same as in the first example of the fourth embodiment.

The column unit of the present invention can be widely applied to electric power steering apparatuses. The column unit is not particularly limited in regards to whether or not there is a tilt mechanism or telescopic mechanism, or whether or not there is an energy absorbing mechanism for absorbing impact during a secondary collision, and can be applied to various kinds of electric power steering apparatuses. In any embodiment, the lower support bracket can be connected and fastened to the end section on the vehicle-front side of the outer column or to part of a housing that comprises a gear housing and sensor housing.

The first embodiment and third and fourth embodiments can be selectively applied according to the application of the electric power steering apparatus, however, the construction of the second embodiment can also be applied to the first embodiment and third and fourth embodiments. Moreover, in the first embodiment, when separate metal components (for example, the integrally formed gear housing and sensor housing) are connected to the molded parts that are integrally molded using synthetic resin (for example, the outer column, lower support bracket and upper support bracket), it is also possible to apply the construction of the third and fourth embodiments.

EXPLANATION OF THE REFERENCE NUMBERS

1 Steering wheel
2 Steering unit
3 Input shaft
4 Tie rod
5 Steering shaft
6, 6a to 6j Steering column
7 Worm reducer
8 Torque measurement apparatus
9, 9a to 9d Housing
10 Electric motor
11 Torsion bar
12 Input shaft
13 Output shaft
14 Displacement sensor
15a, 15b Universal joint
16 Intermediate shaft
17 Vehicle body
18 Upper support bracket
19 Support cylinder
20 Sensor housing
21 Gear housing
22 Cylindrical section
23 Lower support bracket
24 Outer column
25 Inner column
26 Support cylinder
27 Sleeve
28 Protrusion
29, 29a, 29b, 29c Main section
30 Outer column
31 Inner circumferential surface
32 Rib
33 Steering lock apparatus installation section
34 Protrusion
35 Shear pin
36 Impact absorbing protrusion
37 Distance bracket
38 Inner column
38A Through hole
39 Outer circumferential surface
40a Upper steering shaft
40b Lower steering shaft
41 Outer circumferential surface
42 Tolerance ring
42A Inner side convex section
43 Key-lock collar
43A Groove
44 Steering lock apparatus
45 Gear housing
45A Female screw
45B Ring-shaped groove section
46 Output shaft
47a, 47b Gear
48 Torsion bar
49 Worm wheel
50 Worm
51 Electric motor
52 Front cover
52A Male screw
52B Ring-shaped convex section
53 Front cover
53A Bolt
54 Lower support bracket
55 Installation hole
56 Sensor housing
57 Torque sensor (displacement sensor)
58 Opening section
59a, 59b, 59c Upper support bracket
60 Installation hole
61 Top plate
62 Side plate
63 Installation hole
64 Long tilt adjustment groove
65 Tightening rod
65A Head section
65B Male screw
66 Stationary cam
67 Movable cam
68 Operation lever
69 Nut
70 Center axis line
71 Vehicle body
72 Lower installation bolt
72A Shaft section
72B Male screw
72C Head section
73 Lower vehicle installation plate
73A Side plate
74 Sleeve
75 Lower notch groove
75A Closed end section
75B Edge section on the vehicle-bottom side
76 Nut
77 Washer
78 Upper installation bolt
78A Shaft section
78B Male screw
78C Head section
79 Upper vehicle installation plate
79A Side plate
80 Sleeve
81 Upper notch groove
81A Edge section on the vehicle-bottom side
81C Convex section
82 Nut
83 Washer
84 Upper vehicle installation plate
84A Side plate
85 Upper notch groove
85A Closed end section
85B Edge section on the vehicle-bottom side
85C Convex section
86 Upper vehicle installation plate
86A Side plate
87 Cover
88, 88a Bent section
89, 89a Large-diameter cylindrical section
90a, 90b, 90c, 90d Through holes
91 Reinforcement rib
92 Notch
93 Protrusion
94, 94a Screw ring 95 Through hole
96, 96a Male screw
97, 97a Cylindrical section
98 Stepped large-diameter section
99, 99a Female screw
100, 100a Stepped surface
101 Flange section
102 Stepped small-diameter section
103 Inclined step section
104 Large-diameter section

What is claimed is:

1. A column unit for an electric power steering apparatus configured for installation in a vehicle body defining a forward direction, a vehicle-front side, and a vehicle-rear side, the column unit comprising:
a steering column comprising an outer column and an inner column, the inner column being located on the vehicle-rear side of the outer column, located inside the outer column, adapted to collapse toward the vehicle-front side during a secondary collision, and having an inside that supports a steering shaft such that the steering shaft can rotate;
a housing comprising a sensor housing and a gear housing, the sensor housing houses a torque sensor that detects torque acting on the steering shaft, and the gear housing houses part of an electric assist mechanism that applies a specified steering assist force according to a torque value detected by the torque sensor;
a front cover for sealing an end surface of the gear housing on the vehicle-front side thereof, the front cover being screwed into the end surface of the gear housing and fastened to the gear housing by melting and fusing joined surfaces of the front cover and the gear housing while applying pressure;
a lower support bracket adapted to fasten the vehicle-front side of the outer column or the housing to the vehicle body; and
an upper support bracket adapted to fasten the vehicle-rear side of the outer column to the vehicle body,
wherein the gear housing and the outer column are integrally formed of synthetic resin, or the outer column, the lower support bracket and the upper support bracket are integrally formed of synthetic resin.

2. The column unit for an electric power steering apparatus according to claim 1, wherein in addition to the gear housing and the outer column, the lower support bracket and the sensor housing are integrally formed of the synthetic resin.

3. The column unit for an electric power steering apparatus according to claim 1, wherein in addition to the gear housing and the outer column, the lower supper bracket, the sensor housing and the upper support bracket are integrally formed of the synthetic resin.

4. The column unit for an electric power steering apparatus according to claim 1, wherein the synthetic resin is mixed with glass fibers.

5. A column unit for an electric power steering apparatus configured for installation in a vehicle body defining a forward direction, a vehicle-front side, and a vehicle-rear side, the column unit comprising:
a steering column comprising an outer column and an inner column, the inner column being located on the vehicle-rear side of the outer column, located inside the outer column, adapted to collapse toward the vehicle-front side during a secondary collision, and having an inside that supports a steering shaft such that the steering shaft can rotate;
a housing comprising a sensor housing and a gear housing, the sensor housing houses a torque sensor that detects torque acting on the steering shaft, and the gear housing houses part of an electric assist mechanism that applies a specified steering assist force according to a torque value detected by the torque sensor;
a lower support bracket adapted to fasten the vehicle-front side of the outer column or the housing to the vehicle body; and
an upper support bracket adapted to fasten the vehicle-rear side of the outer column to the vehicle body,
wherein the gear housing and the outer column are integrally formed of synthetic resin, or the outer column, the lower support bracket and the upper support bracket are integrally formed of synthetic resin;
wherein an outer circumferential surface of the inner column is fitted with an inner circumferential surface of the outer column with an interference fit, and shear pins adapted to shear off during a secondary collision are provided between the outer column and the inner column.

6. The column unit for an electric power steering apparatus according to claim 5, wherein a plurality of protrusions are formed in a plurality of locations on the inner circumferential surface of the outer column and extend in an axial direction of the outer column, and the outer circumferential surface of the inner column fits with the protrusions.

7. The column unit for an electric power steering apparatus according to claim 5, wherein in addition to the gear housing and the outer column, the lower support bracket and the sensor housing are integrally formed of the synthetic resin.

8. The column unit for an electric power steering apparatus according to claim 5, wherein in addition to the gear housing and the outer column, the lower supper bracket, the sensor housing and the upper support bracket are integrally formed of the synthetic resin.

9. The column unit for an electric power steering apparatus according to claim 5, wherein the synthetic resin is mixed with glass fibers.

10. A column unit for an electric power steering apparatus configured for installation in a vehicle body defining a front/rear direction, an upward direction, a vehicle-front side, a vehicle-rear side, a vehicle-top side, and a vehicle-bottom side, the column unit, comprising:
a steering column comprising an outer column and an inner column, the outer column being made of synthetic resin, the inner column being located on the vehicle-rear side of the outer column, located inside the outer column, adapted to collapse toward the vehicle-front side during a secondary collision, and having an inside that supports a steering shaft such that the steering shaft can rotate;
a lower support bracket integrally formed with the vehicle-front side of the outer column or having a portion integrally formed with the vehicle-front side of the outer column so as to protrude in the upward direction toward the vehicle-top side, the lower support bracket comprising a lower installation hole that is parallel with a horizontal axis line that is orthogonal to a center axis of the outer column;
an upper support bracket formed on the vehicle-rear side of the outer column so as to protrude in the upward direction toward the vehicle-top side, the lower support bracket comprising an upper installation hole that is parallel with a horizontal axis line that is orthogonal to the center axis of the outer column;

a metal lower installation bolt inserted through the lower installation hole and adapted for fastening the lower support bracket to a metal lower vehicle installation plate fastened to the vehicle body; and a metal upper installation bolt inserted through the upper installation hole and adapted for fastening the upper support bracket to a metal upper vehicle installation plate fastened to the vehicle body, wherein a metal hollow cylindrical shaped sleeve is fitted around a shaft section of the lower installation bolt, and an outer circumferential surface of the hollow cylindrical shaped sleeve fits inside the lower installation hole.

11. The column unit for an electric power steering apparatus according to claim 10, further comprising the lower vehicle installation plate and the upper vehicle installation plate, the lower vehicle installation plate comprising lower notch grooves which are closed on the vehicle-front side and open on the vehicle-rear side and through which the lower installation bolt is inserted, and the upper vehicle installation plate comprising upper notch grooves which are closed on the vehicle-front side and open on the vehicle-rear side and through which the upper installation bolt is inserted.

12. The column unit for an electric power steering apparatus according to claim 11, wherein each of the lower notch grooves and upper notch grooves has a groove width that is wider on the vehicle-rear side than the vehicle-front side.

13. The column unit for an electric power steering apparatus according to claim 11, wherein the upper notch grooves have closed end sections on the vehicle-front side thereof, edge sections on the vehicle-bottom side thereof between the closed end section thereof and the vehicle-rear side thereof, and convex sections on the edge sections, and wherein the convex sections protrude farther in the upward direction toward the vehicle-top side on the vehicle-rear side thereof than on the closed end sections thereof.

14. The column unit for an electric power steering apparatus according to claim 11, wherein each of the lower and upper notch grooves has a closed end section on the vehicle-front side thereof, an open end section on the vehicle-rear side thereof, and an edge section therebetween on the vehicle-bottom side thereof, each of the edge sections of the lower and upper notch grooves has a length from the closed end section thereof to the open end section thereof, and the lengths of the lower notch grooves are longer than the lengths of the upper notch grooves.

15. The column unit for an electric power steering apparatus according to claim 10, further comprising a plurality of upper support brackets that are separated in the front/rear direction of the vehicle body on the vehicle-rear side of the outer column.

16. A column unit for an electric power steering apparatus configured for installation in a vehicle body defining a front/rear direction, an upward direction, a vehicle-front side, a vehicle-rear side, a vehicle-top side, and a vehicle-bottom side, the column unit, comprising:

a steering column comprising an outer column and an inner column, the outer column being made of synthetic resin, the inner column being located on the vehicle-rear side of the outer column, located inside the outer column, adapted to collapse toward the vehicle-front side during a secondary collision, and having an inside that supports a steering shaft such that the steering shaft can rotate;

a lower support bracket integrally formed with the vehicle-front side of the outer column or having a portion integrally formed with the vehicle-front side of the outer column so as to protrude in the upward direction toward the vehicle-top side, the lower support bracket comprising a lower installation hole that is parallel with a horizontal axis line that is orthogonal to a center axis of the outer column;

an upper support bracket formed on the vehicle-rear side of the outer column so as to protrude in the upward direction toward the vehicle-top side, the lower support bracket comprising an upper installation hole that is parallel with a horizontal axis line that is orthogonal to the center axis of the outer column;

a metal lower installation bolt inserted through the lower installation hole and adapted for fastening the lower support bracket to a metal lower vehicle installation plate fastened to the vehicle body; and a metal upper installation bolt inserted through the upper installation hole and adapted for fastening the upper support bracket to a metal upper vehicle installation plate fastened to the vehicle body, wherein a metal hollow cylindrical shaped sleeve is fitted around a shaft section of the upper installation bolt, and an outer circumferential surface of the hollow cylindrical shaped sleeve fits inside the upper installation hole.

17. The column unit for an electric power steering apparatus according to claim 16, further comprising the lower vehicle installation plate and the upper vehicle installation plate, the lower vehicle installation plate comprising lower notch grooves which are closed on the vehicle-front side and open on the vehicle-rear side and through which the lower installation bolt is inserted, and the upper vehicle installation plate comprising upper notch grooves which are closed on the vehicle-front side and open on the vehicle-rear side and through which the upper installation bolt is inserted.

18. The column unit for an electric power steering apparatus according to claim 17, wherein each of the lower notch grooves and upper notch grooves has a groove width that is wider on the vehicle-rear side than the vehicle-front side.

19. The column unit for an electric power steering apparatus according to claim 17, wherein the upper notch grooves have closed end sections on the vehicle-front side thereof, edge sections on the vehicle-bottom side thereof between the closed end section thereof and the vehicle-rear side thereof, and convex sections on the edge sections, and wherein the convex sections protrude farther in the upward direction toward the vehicle-top side on the vehicle-rear side thereof than on the closed end sections thereof.

20. The column unit for an electric power steering apparatus according to claim 17, wherein each of the lower and upper notch grooves has a closed end section on the vehicle-front side thereof, an open end section on the vehicle-rear side thereof, and an edge section therebetween on the vehicle-bottom side thereof, each of the edge sections of the lower and upper notch grooves has a length from the closed end section thereof to the open end section thereof, and the lengths of the lower notch grooves are longer than the lengths of the upper notch grooves.

21. The column unit for an electric power steering apparatus according to claim 16, further comprising a plurality of upper support brackets that are separated in the front/rear direction of the vehicle body on the vehicle-rear side of the outer column.

* * * * *